United States Patent
Richley et al.

(10) Patent No.: US 9,854,558 B2
(45) Date of Patent: Dec. 26, 2017

(54) RECEIVER PROCESSOR FOR ADAPTIVE WINDOWING AND HIGH-RESOLUTION TOA DETERMINATION IN A MULTIPLE RECEIVER TARGET LOCATION SYSTEM

(71) Applicant: ZIH CORP., Lincolnshire, IL (US)

(72) Inventors: Edward A. Richley, Gaithersburg, MD (US); Belinda Turner, Germantown, MD (US); Chang Wang, Boyds, MD (US); Aitan Ameti, Germantown, MD (US)

(73) Assignee: ZIH Corp., Lincolnshire, IL (US)

( * ) Notice: Subject to any disclaimer, the term of this patent is extended or adjusted under 35 U.S.C. 154(b) by 63 days.

(21) Appl. No.: 14/729,669

(22) Filed: Jun. 3, 2015

(65) Prior Publication Data

US 2015/0358938 A1 Dec. 10, 2015

Related U.S. Application Data

(60) Provisional application No. 62/008,234, filed on Jun. 5, 2014.

(30) Foreign Application Priority Data

May 29, 2015 (WO) .................. PCT/IB2015/054103

(51) Int. Cl.
*H04L 27/00* (2006.01)
*H04W 64/00* (2009.01)
(Continued)

(52) U.S. Cl.
CPC ......... *H04W 64/006* (2013.01); *G01S 5/0221* (2013.01); *H04L 7/0331* (2013.01);
(Continued)

(58) Field of Classification Search
CPC .................................................... H04B 1/7183
(Continued)

(56) References Cited

U.S. PATENT DOCUMENTS 3,732,500 A 5/1973 Dishal et al.
4,270,145 A 5/1981 Farina
(Continued)

FOREIGN PATENT DOCUMENTS

EP 1235077 A2 8/2002
EP 1241616 A2 9/2002
(Continued)

OTHER PUBLICATIONS

Defendant's Answer to Complaint before the United States District Court of Massachusetts, Civil Action No. 1:15-cv-12297, *Lynx System Developers, Inc. et al. V. Zebra Enterprise Solutions Corporation et al.*, filed Apr. 6, 2016.
(Continued)

*Primary Examiner* — William D Cumming

(57) ABSTRACT

The present invention provides methods for a high-resolution active RTLS tag location determination system that provides for <1 ns TOA accuracy and resolution and significantly reduces the channel effects of multipath interference, even in low SNR applications. To accomplish these objectives, the present invention provides for an iterative and adaptive windowing function in each of the receivers of a receiver grid that captures multiple reflections of multiple transmissions from each of the associated target RTLS tags. The adaptive windowing function is used in conjunction with an asynchronous transmit and receive clock function that effectively increases resolution of TOA detection to levels less than the minimum detection window width associated with each of the receivers in the receiver grid.

17 Claims, 8 Drawing Sheets

(51) Int. Cl.
*H04W 4/02* (2009.01)
*H04W 24/10* (2009.01)
*H04L 7/033* (2006.01)
*G01S 5/02* (2010.01)

(52) U.S. Cl.
CPC ............ *H04W 4/023* (2013.01); *H04W 24/10* (2013.01); *G01S 5/0215* (2013.01)

(58) Field of Classification Search
USPC .................... 455/456.1; 375/259; 342/450
See application file for complete search history.

(56) References Cited

U.S. PATENT DOCUMENTS

| | | | |
|---|---|---|---|
| 5,046,133 A | 9/1991 | Watanabe et al. | |
| 5,119,104 A * | 6/1992 | Heller | G01S 5/06 342/450 |
| 5,469,409 A | 11/1995 | Anderson et al. | |
| 5,513,854 A | 5/1996 | Daver | |
| 5,645,077 A | 7/1997 | Foxlin | |
| 5,699,244 A | 12/1997 | Clark et al. | |
| 5,793,630 A | 8/1998 | Theimer et al. | |
| 5,901,172 A | 5/1999 | Fontana et al. | |
| 5,920,287 A | 7/1999 | Belcher et al. | |
| 5,930,741 A | 7/1999 | Kramer | |
| 5,995,046 A | 11/1999 | Belcher et al. | |
| 6,028,626 A | 2/2000 | Aviv | |
| 6,121,926 A | 9/2000 | Belcher et al. | |
| 6,176,837 B1 | 1/2001 | Foxlin | |
| 6,204,813 B1 | 3/2001 | Wadell et al. | |
| 6,366,242 B1 | 4/2002 | Boyd et al. | |
| 6,380,894 B1 | 4/2002 | Boyd et al. | |
| 6,593,885 B2 | 7/2003 | Wisherd et al. | |
| 6,655,582 B2 | 12/2003 | Wohl et al. | |
| 6,710,713 B1 | 3/2004 | Russo | |
| 6,812,884 B2 | 11/2004 | Richley et al. | |
| 6,836,744 B1 | 12/2004 | Asphahani et al. | |
| 6,882,315 B2 | 4/2005 | Richley et al. | |
| 7,009,638 B2 | 3/2006 | Gruber et al. | |
| 7,190,271 B2 | 3/2007 | Boyd et al. | |
| 7,263,133 B1 | 8/2007 | Miao | |
| 7,667,604 B2 | 2/2010 | Ebert et al. | |
| 7,671,802 B2 | 3/2010 | Walsh et al. | |
| 7,710,322 B1 | 5/2010 | Ameti et al. | |
| 7,739,076 B1 | 6/2010 | Vock et al. | |
| 7,755,541 B2 | 7/2010 | Wisherd et al. | |
| 7,899,006 B2 | 3/2011 | Boyd | |
| 7,969,348 B2 | 6/2011 | Baker et al. | |
| 8,009,727 B2 | 8/2011 | Hui et al. | |
| 8,023,917 B2 | 9/2011 | Popescu | |
| 8,077,981 B2 | 12/2011 | Elangovan et al. | |
| 8,269,835 B2 | 9/2012 | Grigsby | |
| 8,279,051 B2 | 10/2012 | Khan | |
| 8,289,185 B2 | 10/2012 | Alonso | |
| 8,457,392 B2 | 6/2013 | Cavallaro et al. | |
| 8,477,046 B2 | 7/2013 | Alonso | |
| 8,568,278 B2 | 10/2013 | Riley et al. | |
| 8,665,152 B1 | 3/2014 | Kling et al. | |
| 8,696,458 B2 | 4/2014 | Foxlin et al. | |
| 8,705,671 B2 | 4/2014 | Ameti et al. | |
| 8,775,916 B2 | 7/2014 | Pulsipher et al. | |
| 8,780,204 B2 | 7/2014 | DeAngelis et al. | |
| 8,795,045 B2 | 8/2014 | Sorrells et al. | |
| 8,842,002 B2 | 9/2014 | Rado | |
| 8,989,880 B2 | 3/2015 | Wohl et al. | |
| 9,081,076 B2 | 7/2015 | DeAngelis et al. | |
| 9,381,645 B1 | 7/2016 | Yarlagadda et al. | |
| 2001/0010541 A1 | 8/2001 | Fernandez et al. | |
| 2001/0030625 A1 | 10/2001 | Doles et al. | |
| 2002/0004398 A1 | 1/2002 | Ogino et al. | |
| 2002/0041284 A1 | 4/2002 | Konishi et al. | |
| 2002/0114493 A1 | 8/2002 | McNitt et al. | |
| 2002/0116147 A1 | 8/2002 | Vock et al. | |
| 2002/0130835 A1 | 9/2002 | Brosnan | |
| 2002/0135479 A1 | 9/2002 | Belcher et al. | |
| 2003/0090387 A1 | 5/2003 | Lestienne et al. | |
| 2003/0095186 A1 | 5/2003 | Aman et al. | |
| 2003/0128100 A1 | 7/2003 | Burkhardt et al. | |
| 2003/0163287 A1 | 8/2003 | Vock et al. | |
| 2003/0227453 A1 | 12/2003 | Beier et al. | |
| 2004/0022227 A1 | 2/2004 | Lynch et al. | |
| 2004/0062216 A1 | 4/2004 | Nicholls et al. | |
| 2004/0108954 A1 | 6/2004 | Richley et al. | |
| 2004/0178960 A1 | 9/2004 | Sun | |
| 2004/0189521 A1 | 9/2004 | Smith et al. | |
| 2004/0249969 A1 | 12/2004 | Price | |
| 2004/0260470 A1 | 12/2004 | Rast | |
| 2004/0260828 A1 | 12/2004 | Price | |
| 2005/0026563 A1 | 2/2005 | Leeper et al. | |
| 2005/0031043 A1 * | 2/2005 | Paquelet | H04B 1/7183 375/259 |
| 2005/0059998 A1 | 3/2005 | Norte et al. | |
| 2005/0075079 A1 | 4/2005 | Jei et al. | |
| 2005/0093976 A1 | 5/2005 | Valleriano | |
| 2005/0148281 A1 | 7/2005 | Sanchez-Castro et al. | |
| 2005/0207617 A1 | 9/2005 | Sarnoff | |
| 2006/0067324 A1 | 3/2006 | Kim | |
| 2006/0139167 A1 | 6/2006 | Davie et al. | |
| 2006/0164213 A1 | 7/2006 | Burghard et al. | |
| 2006/0252476 A1 | 11/2006 | Bahou | |
| 2006/0271912 A1 | 11/2006 | Mickle et al. | |
| 2006/0281061 A1 | 12/2006 | Hightower et al. | |
| 2007/0091292 A1 | 4/2007 | Cho et al. | |
| 2007/0176749 A1 | 8/2007 | Boyd et al. | |
| 2007/0296723 A1 | 12/2007 | Williams | |
| 2008/0065684 A1 | 3/2008 | Zilberman | |
| 2008/0106381 A1 | 5/2008 | Adamec et al. | |
| 2008/0113787 A1 | 5/2008 | Alderucci | |
| 2008/0129825 A1 | 6/2008 | DeAngelis et al. | |
| 2008/0140233 A1 | 6/2008 | Seacat | |
| 2008/0186231 A1 | 8/2008 | Aljadeff et al. | |
| 2008/0204248 A1 | 8/2008 | Winget et al. | |
| 2008/0262885 A1 | 10/2008 | Jain et al. | |
| 2008/0266131 A1 | 10/2008 | Richardson et al. | |
| 2008/0269016 A1 | 10/2008 | Ungari et al. | |
| 2008/0281443 A1 | 11/2008 | Rodgers | |
| 2008/0285805 A1 | 11/2008 | Luinge et al. | |
| 2008/0291024 A1 | 11/2008 | Zhang et al. | |
| 2009/0048044 A1 | 2/2009 | Oleson et al. | |
| 2009/0141736 A1 | 6/2009 | Becker | |
| 2009/0231198 A1 | 9/2009 | Walsh et al. | |
| 2010/0026809 A1 | 2/2010 | Curry | |
| 2010/0045508 A1 | 2/2010 | Ekbal et al. | |
| 2010/0054304 A1 | 3/2010 | Barnes et al. | |
| 2010/0060452 A1 | 3/2010 | Schuster et al. | |
| 2010/0080163 A1 | 4/2010 | Krishnamoorthi et al. | |
| 2010/0150117 A1 | 6/2010 | Aweya et al. | |
| 2010/0174506 A1 | 7/2010 | Joseph et al. | |
| 2010/0228314 A1 | 9/2010 | Goetz | |
| 2010/0250305 A1 | 9/2010 | Lee et al. | |
| 2010/0278386 A1 | 11/2010 | Hoeflinger | |
| 2010/0283630 A1 | 11/2010 | Alonso | |
| 2010/0328073 A1 | 12/2010 | Nikitin et al. | |
| 2011/0002223 A1 | 1/2011 | Gross | |
| 2011/0025847 A1 | 2/2011 | Park et al. | |
| 2011/0054782 A1 | 3/2011 | Kaahui et al. | |
| 2011/0063114 A1 | 3/2011 | Ikoyan | |
| 2011/0064023 A1 | 3/2011 | Yamamoto et al. | |
| 2011/0084806 A1 | 4/2011 | Perkins et al. | |
| 2011/0134240 A1 | 6/2011 | Anderson et al. | |
| 2011/0140970 A1 | 6/2011 | Fukagawa et al. | |
| 2011/0169959 A1 | 7/2011 | DeAngelis et al. | |
| 2011/0188513 A1 | 8/2011 | Christoffersson et al. | |
| 2011/0195701 A1 | 8/2011 | Cook et al. | |
| 2011/0261195 A1 | 10/2011 | Martin et al. | |
| 2011/0300905 A1 | 12/2011 | Levi | |
| 2011/0320322 A1 | 12/2011 | Roslak et al. | |
| 2012/0014278 A1 | 1/2012 | Ameti et al. | |
| 2012/0015665 A1 | 1/2012 | Farley et al. | |
| 2012/0024516 A1 | 2/2012 | Bhadurt et al. | |
| 2012/0042326 A1 | 2/2012 | Jain et al. | |
| 2012/0057634 A1 | 3/2012 | Shi et al. | |
| 2012/0057640 A1 | 3/2012 | Shi et al. | |

(56) References Cited

U.S. PATENT DOCUMENTS

| | | |
|---|---|---|
| 2012/0065483 A1 | 3/2012 | Chung et al. |
| 2012/0081531 A1 | 4/2012 | DeAngelis et al. |
| 2012/0112904 A1 | 5/2012 | Nagy et al. |
| 2012/0126973 A1 | 5/2012 | Deangelis et al. |
| 2012/0139708 A1 | 6/2012 | Paradiso et al. |
| 2012/0184878 A1 | 7/2012 | Najafi et al. |
| 2012/0212505 A1 | 8/2012 | Burroughs et al. |
| 2012/0218301 A1 | 8/2012 | Miller |
| 2012/0225676 A1 | 9/2012 | Boyd et al. |
| 2012/0231739 A1 | 9/2012 | Chen et al. |
| 2012/0246795 A1 | 10/2012 | Scheffler et al. |
| 2012/0256745 A1 | 10/2012 | Plett et al. |
| 2012/0268239 A1 | 10/2012 | Ljung et al. |
| 2013/0003860 A1 | 1/2013 | Sasai et al. |
| 2013/0021142 A1 | 1/2013 | Matsui et al. |
| 2013/0021206 A1 | 1/2013 | Hach et al. |
| 2013/0040574 A1 | 2/2013 | Hillyard |
| 2013/0041590 A1 | 2/2013 | Burich et al. |
| 2013/0066448 A1 | 3/2013 | Alonso |
| 2013/0076645 A1 | 3/2013 | Anantha et al. |
| 2013/0096704 A1 | 4/2013 | Case |
| 2013/0115904 A1 | 5/2013 | Kapoor et al. |
| 2013/0138386 A1 | 5/2013 | Jain et al. |
| 2013/0142384 A1 | 6/2013 | Ofek |
| 2013/0147608 A1 | 6/2013 | Sadr |
| 2013/0202062 A1 | 8/2013 | Sadr et al. |
| 2013/0257598 A1 | 10/2013 | Kawaguchi et al. |
| 2013/0268185 A1 | 10/2013 | Rabbath et al. |
| 2013/0339156 A1 | 12/2013 | Sanjay et al. |
| 2014/0055588 A1 | 2/2014 | Bangera et al. |
| 2014/0145828 A1 | 5/2014 | Bassan-Eskenazi |
| 2014/0156036 A1 | 6/2014 | Huang |
| 2014/0170607 A1 | 6/2014 | Hsiao et al. |
| 2014/0221137 A1 | 8/2014 | Krysiak et al. |
| 2014/0301427 A1 | 10/2014 | Khalaf-Allah |
| 2014/0320660 A1 | 10/2014 | DeAngelis et al. |
| 2014/0361875 A1 | 12/2014 | O'Hagan et al. |
| 2014/0361906 A1 | 12/2014 | Hughes et al. |
| 2014/0361909 A1 | 12/2014 | Stelfox et al. |
| 2014/0364141 A1 | 12/2014 | O'Hagan et al. |
| 2014/0365415 A1 | 12/2014 | Stelfox et al. |
| 2015/0002272 A1 | 1/2015 | Alonso et al. |
| 2015/0057981 A1 | 2/2015 | Gross |
| 2015/0085111 A1 | 3/2015 | Lavery |
| 2015/0097653 A1 | 4/2015 | Gibbs et al. |
| 2015/0148129 A1 | 5/2015 | Austerlade et al. |
| 2015/0355311 A1 | 12/2015 | O'Hagan et al. |
| 2015/0356332 A1 | 12/2015 | Turner et al. |
| 2015/0358771 A1 | 12/2015 | Richley et al. |
| 2015/0358852 A1 | 12/2015 | Richley et al. |
| 2015/0360133 A1 | 12/2015 | MacCallum et al. |
| 2015/0375041 A1 | 12/2015 | Richley et al. |
| 2015/0375083 A1 | 12/2015 | Stelfox et al. |
| 2015/0378002 A1 | 12/2015 | Hughes et al. |
| 2015/0379387 A1 | 12/2015 | Richley |
| 2016/0097837 A1 | 4/2016 | Richley et al. |
| 2016/0126989 A1 | 5/2016 | Richley |

FOREIGN PATENT DOCUMENTS

| | | |
|---|---|---|
| EP | 1253438 A2 | 10/2002 |
| EP | 1503513 A1 | 2/2005 |
| EP | 2474939 A1 | 11/2012 |
| WO | WO-9805977 A1 | 2/1998 |
| WO | WO 99/61936 A1 | 12/1999 |
| WO | WO 0108417 | 2/2001 |
| WO | WO 2006/022548 | 3/2006 |
| WO | WO-2010/083943 A1 | 7/2010 |
| WO | WO 2015/051813 A1 | 4/2014 |
| WO | WO 2014197600 | 12/2014 |

OTHER PUBLICATIONS

U.S. Appl. No. 14/296,703, filed Jun. 5, 2014; In re: Alonson et al., entitle Method and Apparatus for Associating Radio Frequency Identification Tags with Participants.

U.S. Appl. No. 61/895,548, filed Oct. 25, 2013, In re: Alonso et al., entitled "Method, Apparatus, and Computer Program Product for Collecting Sporting Event Data Based on Real Time Data for Proximity and Movement of Objects".

International Search Report and Written Opinion for International Application No. PCT/IB2015/059264 dated Feb. 10, 2016.

Jinyun Zhang et al., "UWB Systems for Wireless Sensor Networks", Proceedings of the IEEE, IEEE. New York, US, vol. 97, No. 2, Feb. 1, 2009 (Feb. 1, 2009), pp. 313-331.

International Search Report and Written Opinion for International Application No. PCT/US2015/034267 dated Sep. 25, 2015.

International Search Report and Written Opinion for International Application No. PCT/IB2015/054103 dated Aug. 14, 2015.

Cheong, P. et al., "Synchronization, TOA and Position Estimation for Low-Complexity LDR UWB Devices", Ultra-Wideband, 2005 IEEE International Conference, Zurich, Switzerland Sep. 5-8, 2005, Piscataway, NJ, USA, IEEE, Sep. 5, 2005, pp. 480-484.

International Search Report and Written Opinion for International Application No. PCT/IB2015/054213 dated Aug. 6, 2015.

Wang, Y. et al., "An Algorithmic and Systematic Approach from Improving Robustness of TOA-Based Localization", 2013 IEEE 10th International Conference on High Performance Computing and Communications & 2013 IEEE, Nov. 13, 2013, pp. 2066-2073.

Guvenc, I. et al., "A Survey on TOA Based Wireless Localization and NLOA Mitigation Techniques", IEEE Communications Surveys, IEEE, New York, NY, US, vol. 11, No. 3, Oct. 1, 2009, pp. 107-124.

International Search Report and Written Opinion for International Application PCT/IB2015/054102 dated Nov. 4, 2015.

"Seattleite wins top prize in Microsoft's Super Bowl tech Contest", San Francisco AP, Komonews.com, Feb. 6, 2016. <http://komonews.com/news/local/seattleite-wins-top-prize-in-microsofts-super-bowl-tech-contest>.

Bahle et al., "I See You: How to Improve Wearable Activity Recognition by Leveraging Information from Environmental Cameras," Pervasive Computing and Communications Workshops, IEEE International Conference, (Mar. 18-22, 2013).

Teixeira et al., "Tasking Networked CCTV Cameras and Mobile Phones to Identify and Localize Multiple People," Ubicomp '10 Proceedings of the 12th ACM International Conference on Ubiquitous Computing, pp. 213-222 (Sep. 26-29, 2010).

Complaint before the United States District Court of Massachusetts, Civil Action No. 1:15-cv-12297, *Lynx System Developers, Inc. et al.* V. *Zebra Enterprise Solutions Corporation et al.*, filed Mar. 23, 2016.

Invention to Pay Additional Fees/Partial International Search Report for PCT/IB2015/054099 dated Oct. 6, 2015.

International Search Report and Written Opinion for International Application No. PCT/IB2015/054099 dated Dec. 9, 2015.

Swedberg, Claire, "USDA Researchers Develop System to Track Livestock Feeding Behavior Unobtrusively", RFID Journal, Jul. 18, 2013.

International Search Report and Written Opinion from International Application No. PCT/US2014/041062 dated Oct. 1, 2014.

International Search Report and Written Opinion from International Application No. PCT/US2014/040947 dated Oct. 9, 2014.

Fontana, R.J., Richley, E., Barney, J., "Commercialization of an Ultra Wideband Precision Asset Location System," *2003 IEEE Conference on Ultra Wideband Systems and Technologies*, Nov. 16-19, 2003.

Gueziec, A., "Tracking Pitches for Broadcast Television," *Computer*, Aug. 7, 2002.

CattleLog Pro, *eMerge Interactive, Inc.*, Sebastian, FL, 2004.

Marchant, J., Secure Animal Identification and Source Verification, *JM Communications*, UK, 2002.

"A Guide to Using NLIS Approved Ear Tags and Rumen Boluses," National Livestock Identification Scheme, *Meat & Livestock Australia Limited*, North Sydney, Australia, May 2003.

(56) References Cited

OTHER PUBLICATIONS

King, L., "NAIS Cattle ID Pilot Projects Not Needed, Since Proven Advanced Technology Already Exists," *ScoringSystem, Inc.*, Sarasota, FL, Dec. 27, 2005. (www.prweb.com/releases/2005/12prweb325888.htm).

"RFID in the Australian Meat and Livestock Industry," Allflex Australia Pty Ltd,Capalaba, QLD (AU), *Data Capture Suppliers Guide*, 2003-2004.

International Search Report and Written Opinion from International Application No. PCT/US2014/040881 dated Nov. 4, 2014.

Swedberg, C., "N.J. Company Seeks to Market Passive Sensor RFID Tags," *RFID Journal*, Jun. 20, 2013.

International Search Report and Written Opinion from International Application No. PCT/US2014/040940 dated Dec. 17, 2014.

Complaint before the United States District Court of Massachusetts, Civil Action No. 1:15-cv-12297, *Lynx System Developers, Inc. et al. v. Zebra Enterprise Solutions Corporation et al.*, filed Jun. 10, 2015.

European Search Report for European Patent Application No. 14806811.7 dated Dec. 9, 2016.

International Search Report for International Application No. PCT/US2014/053647 dated Dec. 19, 2014.

International Search Report and Written Opinion for International Application No. PCT/US2016/035614 dated Sep. 15, 2016.

Zhu et al., "A Real-Time Articulated Human Motion Tracking Using Tri-Axis Inertial/Magnetic Sensors Package," IEEE Transactions on Neural Systems and Rehabilitation Engineering, vol. 12, No. 2, Jun. 2004, pp. 295-302.

\* cited by examiner

US 9,854,558 B2

RECEIVER PROCESSOR FOR ADAPTIVE WINDOWING AND HIGH-RESOLUTION TOA DETERMINATION IN A MULTIPLE RECEIVER TARGET LOCATION SYSTEM

CROSS-REFERENCE TO RELATED APPLICATION

This application claims the benefit of the filing date of U.S. Provisional Application 62/008,234, filed Jun. 5, 2014, the entire contents of which are incorporated herein by reference.

FIELD

Embodiments discussed herein are related to radio frequency locating and, more particularly, to systems, methods, apparatuses, computer readable media and other means for target location by high-resolution time-of-arrival (TOA) determination in a multiple receiver target location system.

BACKGROUND

A number of deficiencies and problems associated with UWB Real Time Locating Systems particularly related to interference are identified herein. Through applied effort, ingenuity, and innovation, exemplary solutions too many of these identified problems are embodied by the present invention, which is described in detail below.

BRIEF SUMMARY OF THE INVENTION

Systems, methods, apparatuses, and computer readable media are disclosed for providing interference rejection in Ultra-Wideband Real Time Locating Systems. A brief summary is provided in the following.

In some examples, a method, apparatus, and computer program product (CPP) for determining target location in a multiple receiver target location system is disclosed herein, comprising: determining a coarse estimate of a time-of-arrival (TOA) from at least two of a plurality of receivers based on a detection of a pulse in an adjustable coarse timing window, determining a fine estimate of the TOA from the at least two of the plurality of receivers based on a detection of the pulse in at least one of a set of fine timing windows, and determining a sub-window resolution of the TOA from the at least two of the plurality of receivers based on at least one detection transition between consecutive fine receiver windows of at least one of a plurality of pulses.

In some examples, the method apparatus, and CPP further comprises: determining a first coarse timing window based on the detection of a pulse for at least two of the plurality of receivers, determining a plurality of coarse timing windows based on the detection of a plurality of pulses and a coarse timing window function for at least two of the plurality of receivers, and determining a parallel set of fine timing windows based on at least one of the plurality of coarse timing windows.

In some examples, determining the plurality of coarse timing windows may comprise an iterative, adaptive feedback loop. The feedback loop is driven by a detection pattern.

In some examples, determining the parallel set of fine timing windows further comprises the determining of a set of fine timing windows synchronous to a receiver clock. The set of fine timing windows synchronous to the receiver clock are disjoint. The determining the sub-window resolution of the TOA comprises an averaging. The determining the coarse estimate, the fine estimate, and the sub-window resolution of the TOA comprises a plurality of parallel detectors. The plurality of parallel detectors comprises distinct detection levels.

In some examples, TOA is an earliest detection of the detection of the pulse from the plurality of parallel detectors. The TOA is associated with a tag unique identifier. The tag unique identifier is decoded at each of the plurality of receivers from a data packet transmitted by the target. The tag unique identifier decoding comprises one of an asynchronous and synchronous sampling. The synchronous sampling comprises the receiver clock. The asynchronous sampling comprises a target transmit clock recovery. The target transmit clock recovery comprises a tracking of the plurality of pulses. Further, the tracking of the plurality of pulses comprises a phase-locked loop (PLL).

BRIEF DESCRIPTION OF THE SEVERAL VIEWS OF THE DRAWINGS

Figure 1:
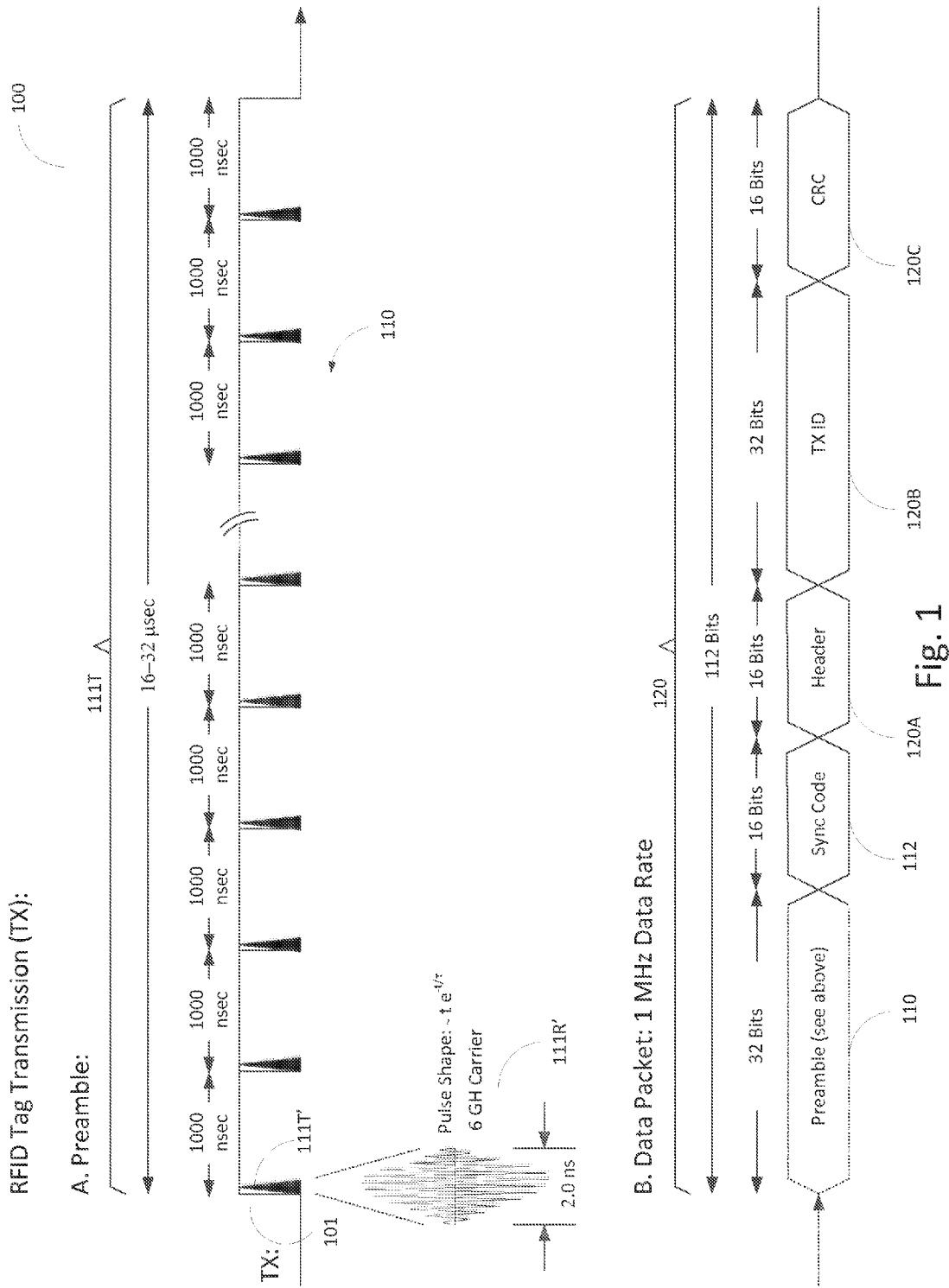
Figure 2:
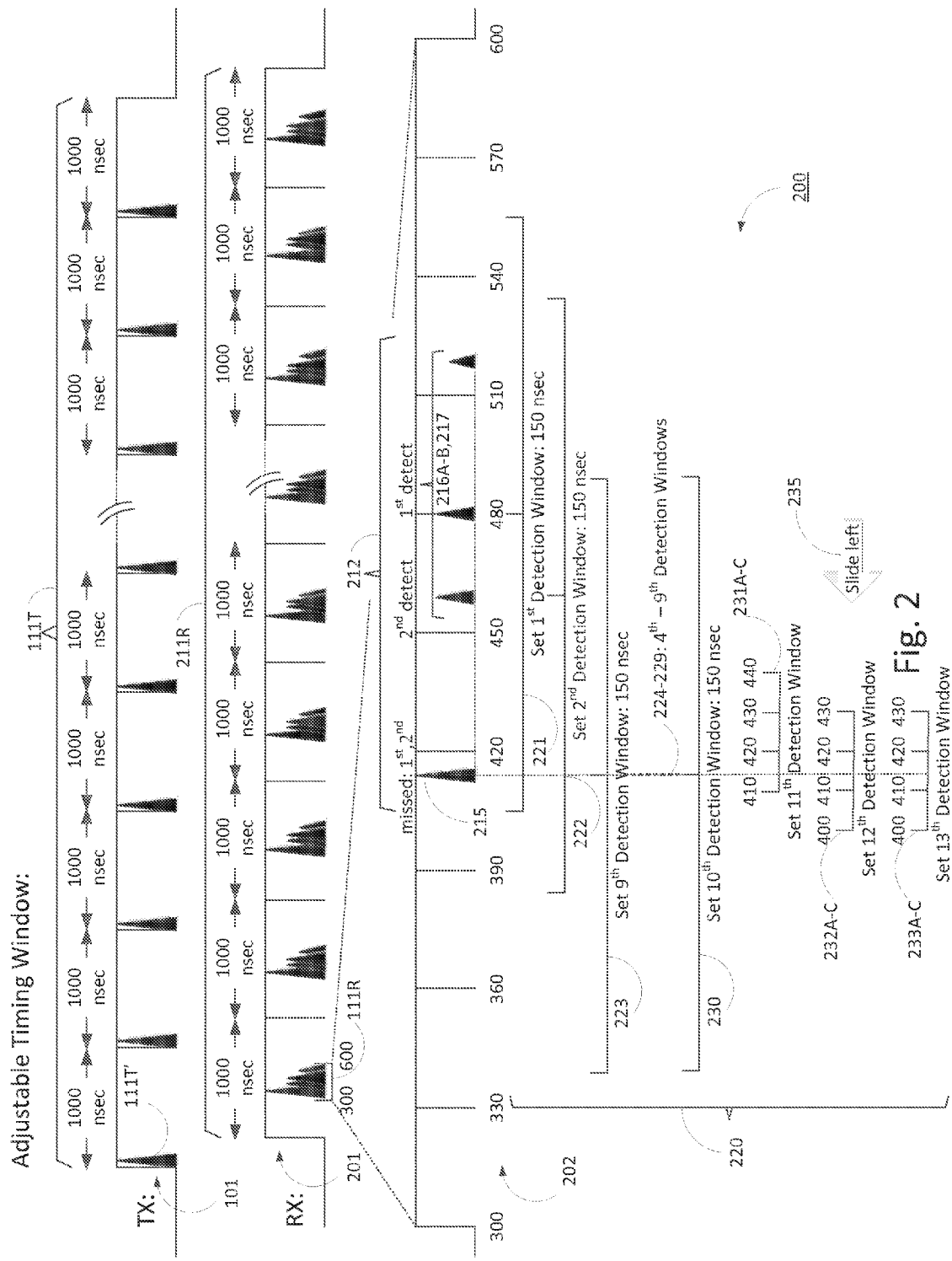
Figure 3:
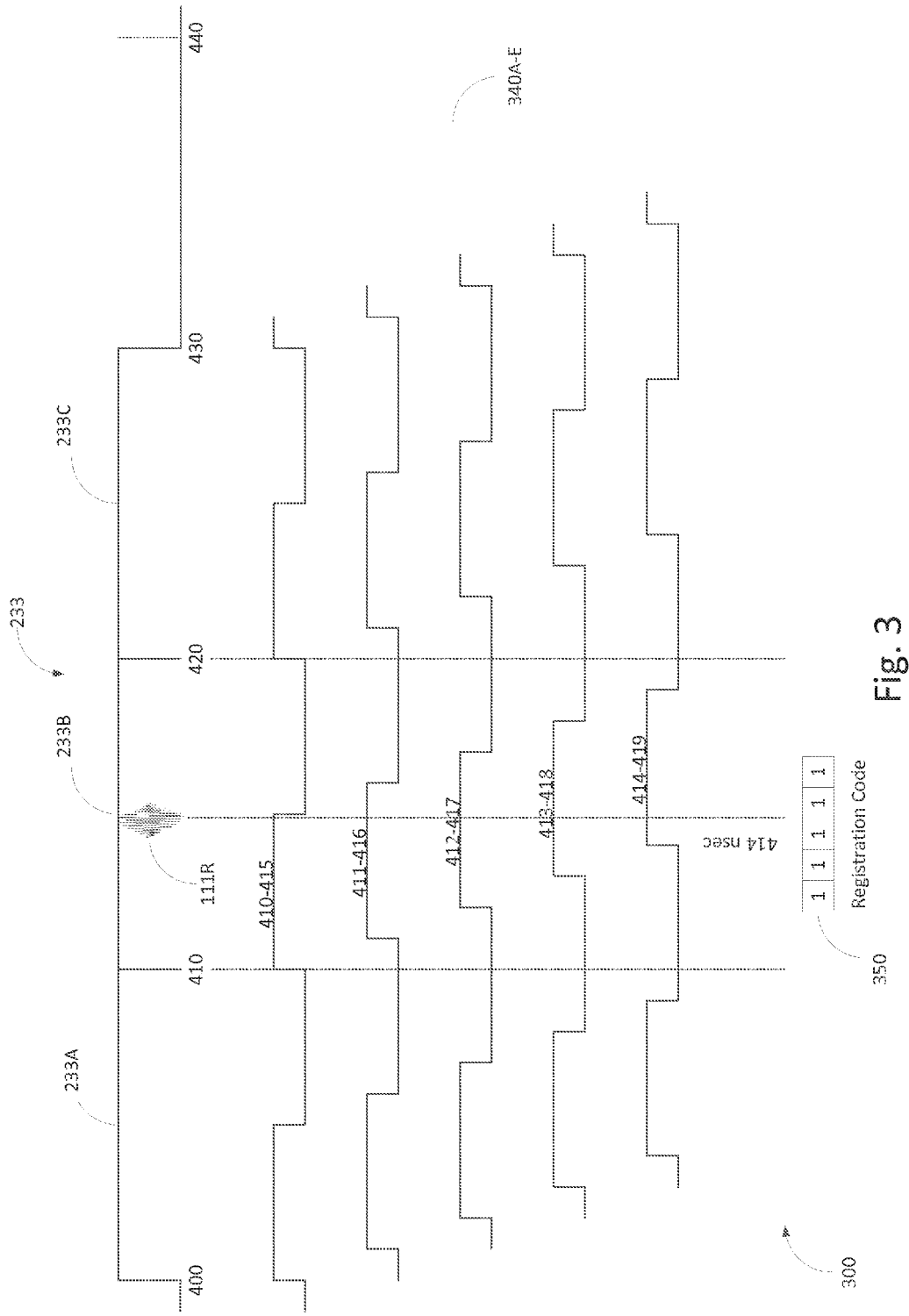
Figure 4:
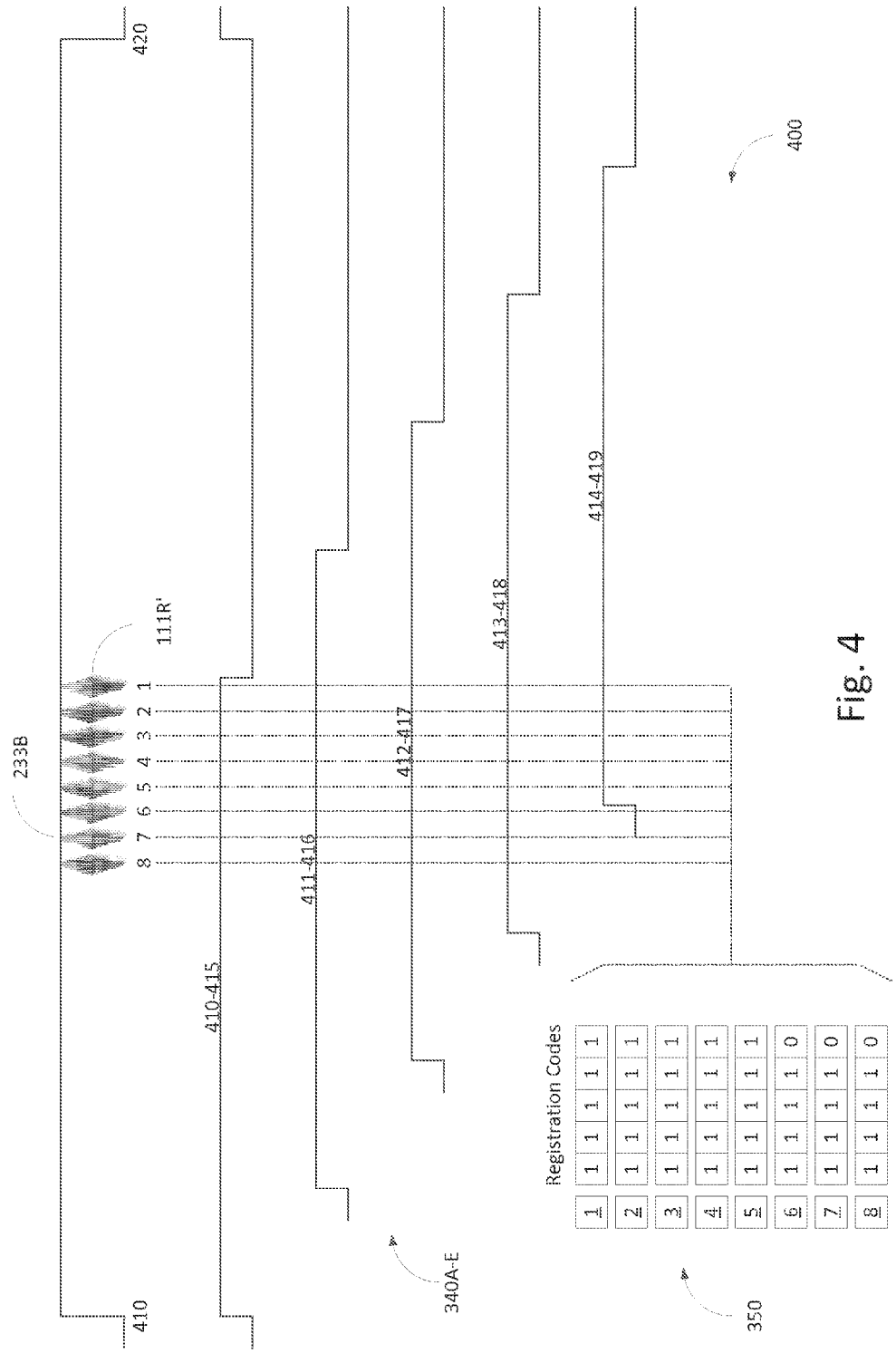
Figure 5:
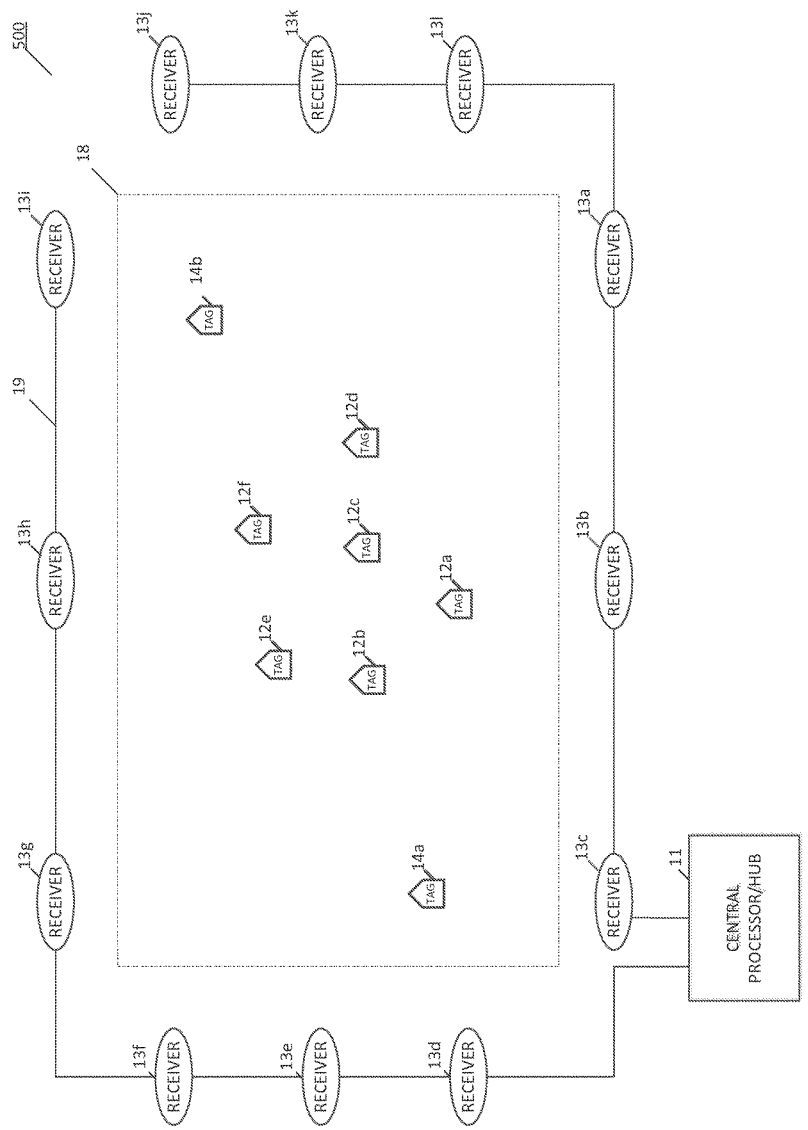
Figure 6:
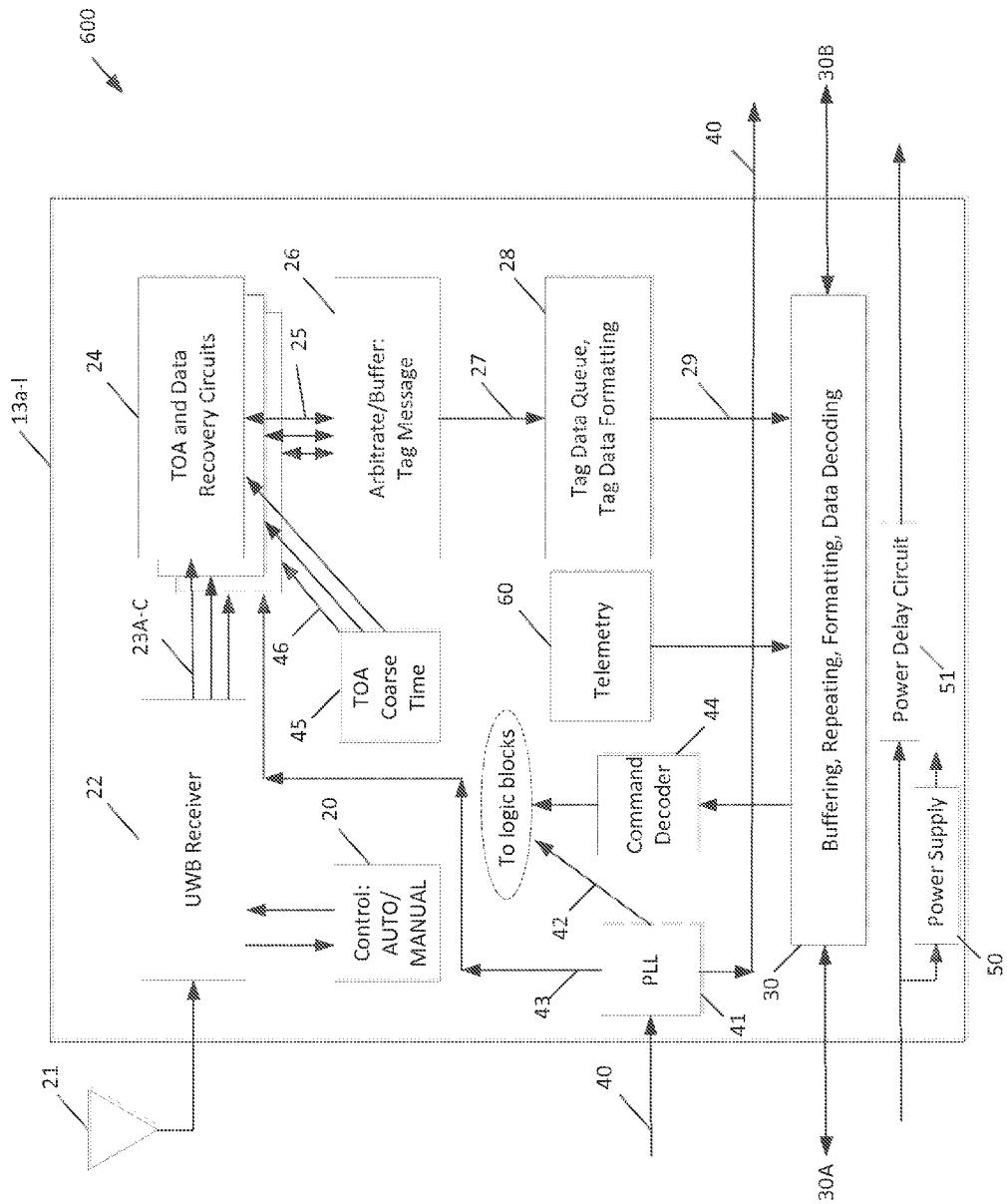
Figure 7:
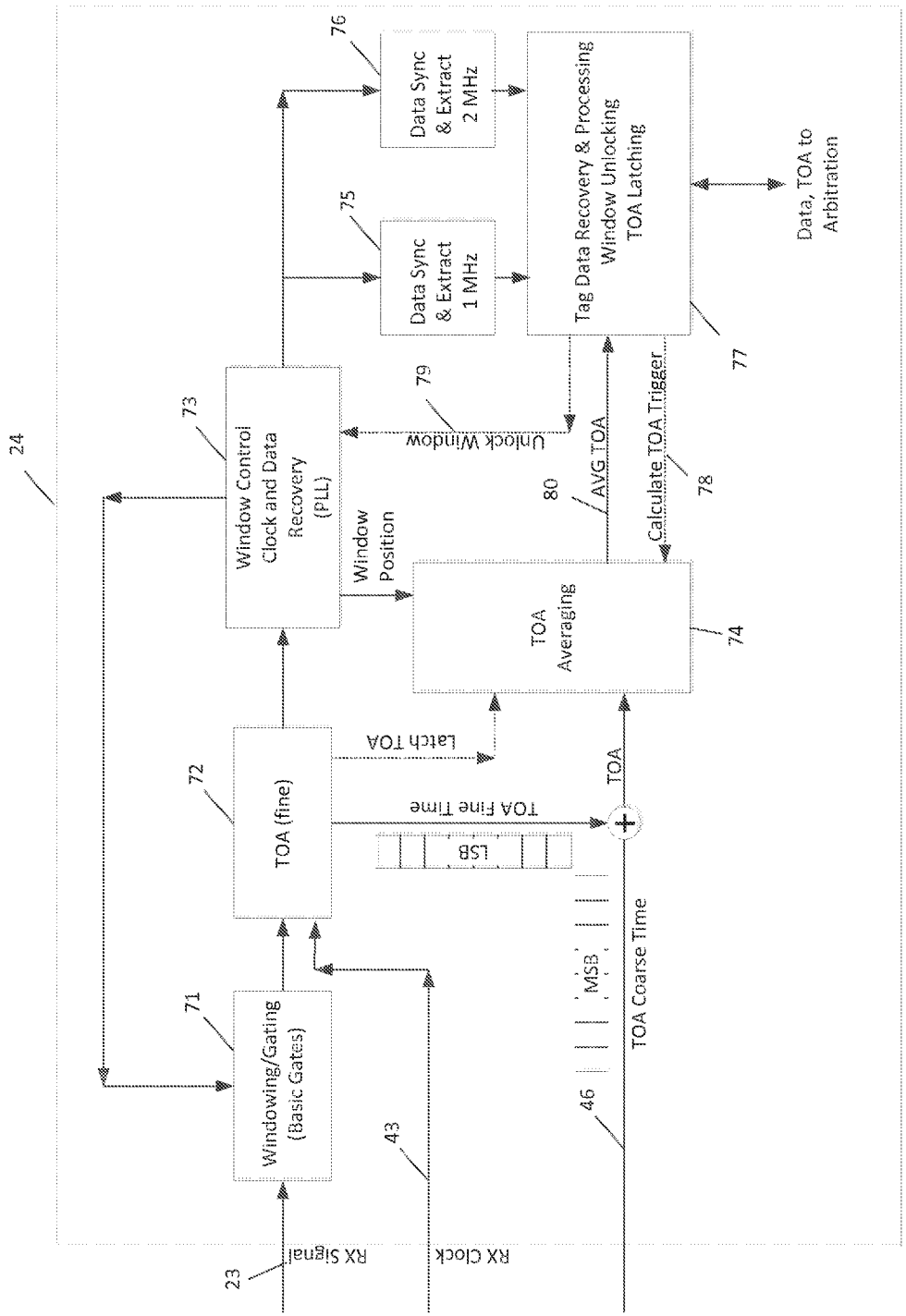
Figure 8A:
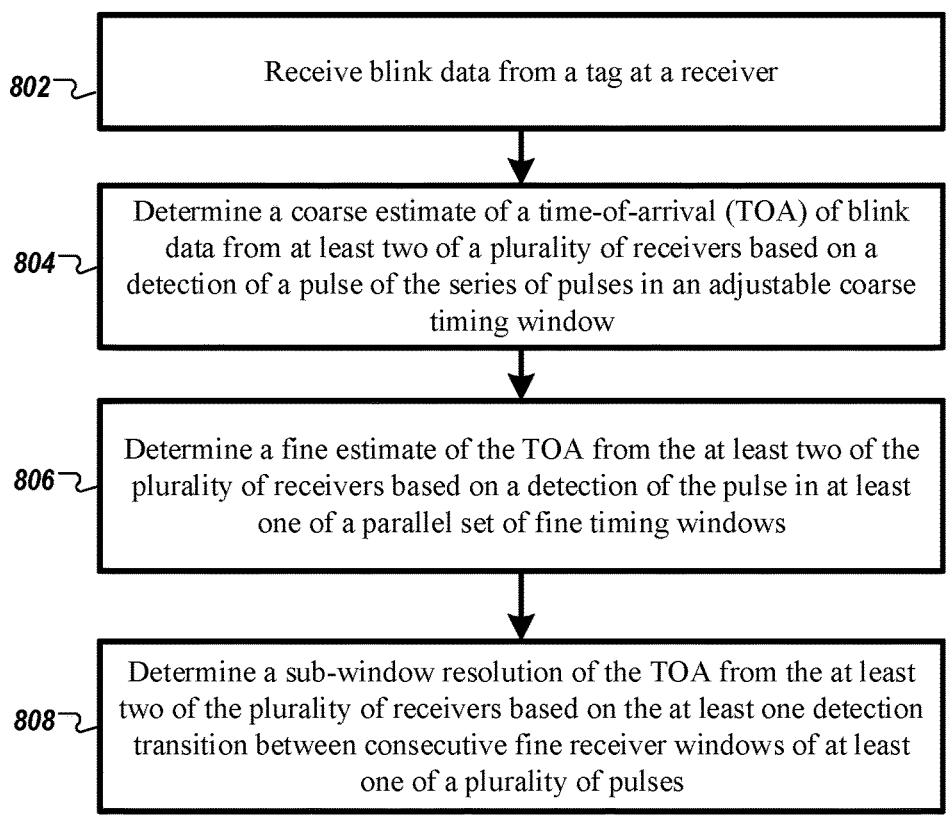
Figure 8B:
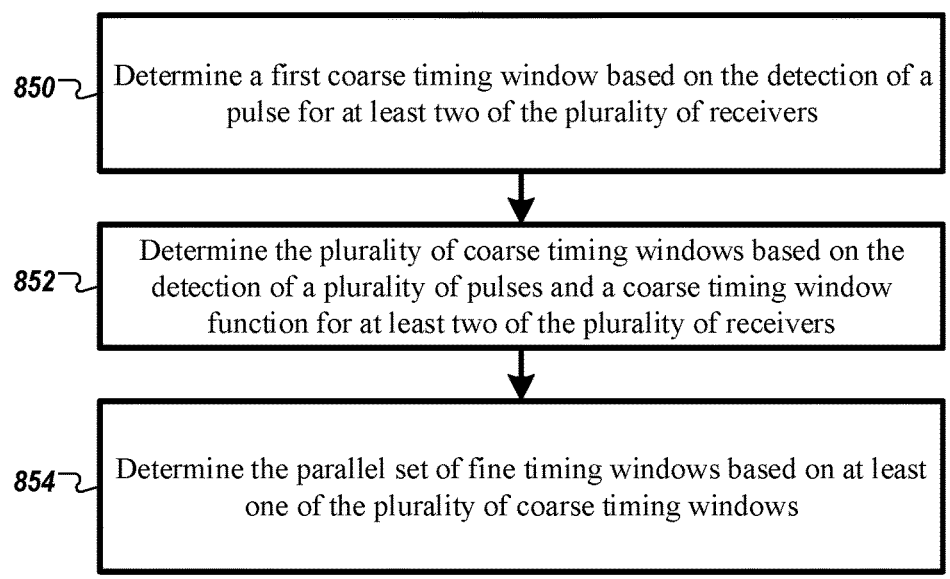

Having thus described the invention in general terms, reference will now be made to the accompanying drawings, which are not necessarily drawn to scale, and wherein:

FIG. 1 shows a timing diagram for an RTLS tag transmission (TX) in an example high-resolution TOA determination system, in accordance with example embodiments of the present invention;

FIG. 2 shows a timing diagram for an adjustable timing window function, in accordance with example embodiments of the present invention;

FIG. 3 shows a timing diagram for a receiver (RX) fine timing window function, in accordance with example embodiments of the present invention;

FIG. 4 shows a timing diagram for a receiver (RX) sub-window resolution function 400, in accordance with example embodiments of the present invention;

FIG. 5 illustrates an exemplary environment using a radio frequency locating system for providing performance analytics in accordance with some embodiments of the present invention;

FIG. 6 illustrates an exemplary receiver in a RTLS system comprising a RTLS receiver that may be configured in accordance with some embodiments of the present invention;

FIG. 7 illustrates an example TOA and recovery circuit function from the exemplary receiver in the RTLS system of FIG. 6, in accordance with some embodiments of the present invention; and FIGS. 8a and 8b are flowcharts illustrating example methods for determining a time of arrival with sub-window resolution.

DETAILED DESCRIPTION OF THE INVENTION

Example embodiments of the present invention now may be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

As such, example embodiments described herein comprise methods for an active RTLS tag target location system that provides for <1 ns TOA accuracy and resolution and significantly reduces the channel effects of multipath interference, even in low SNR applications. To accomplish these objectives, the example embodiments provide for an iterative and adaptive windowing function in one or more of the receivers of the receiver grid that captures multiple reflections of multiple transmissions from one or more of the associated target RTLS tags.

Example High-Resolution Toa Determination in a Multiple Receiver Target Location System Example embodiments described herein comprise methods, apparatus and computer program products for receiver adaptive windowing and for high-resolution TOA determination in a multiple receiver target location system. A target may be a person, animal, object, or the like, to which an RTLS location tag has been mounted for tracking a location associated with target. In some examples, high-resolution TOA determination is achieved even in an instance in which a communication channel suffers from multipath interference and the range requirements provide for a relatively low SNR. In further examples described herein, both issues of multipath interference and low SNR are addressed by an iterative, adaptive windowing function in each of the receivers included in the receiver grid. In further examples, resolution for the TOA determination is improved by increasing the resolution for the detection windows at one or more receivers in the receiver grid for one or more of the series of timing pulses from one or more of the transmitters associated with the target RTLS tags. Resolution for each series of timing pulses from each respective transmitter associated with an RTLS tag is effectively increased, in some examples, by using the aforementioned windows to detect a timestamp for a plurality of bits to generate or otherwise determine a high resolution timestamp.

The systems, tags, receivers and methods for operating the same described herein are configured to establish a timestamp for a received tag transmission signal. The tag transmission signal may be refer to herein as "blink data" or "a blink data pulse" as it is transmitted at selected intervals comprising a blink (e.g., 72 pulses at a blink rate of 1 Mb/s). Blink data may also comprise one or more data packets. Such tag data packets may include any data from the modular location tag that is intended for transmission such as, for example in the depicted embodiment, a tag unique identification number (tag UID), other identification information, a sequential burst count, stored tag data, or other desired information for object or personnel identification, inventory control, etc. In some embodiments, the timestamp may be generated based on a particular timing bit in a transmission. While such a method may generate a timestamp, it is, in some examples, vulnerable to noise (e.g., noise that varies among receivers). In order to mitigate potential noise (or other interference), the systems, tags, receivers and methods for operating the same described herein are configured to dynamically adjust a window so as to more accurately generate a timestamp for a packet. The window, in some examples, may be established using a preamble of the data packet (e.g., the first 16-32 bits comprising a series of 1's or pulses) and then may be applied to synchronization pattern or code (e.g., 16-32 bits in a known pattern of 1's and 0's following the preamble) to generate a timestamp. As such, by establishing a window (e.g. a 30 nanosecond (nsec) window), a receiver may be configured to generate a timestamp (e.g., a timestamp with a 1 nsec resolution) for a given pulse.

In examples where an adjustable time window is used, such as a 30 ns window, and by establishing such a window during the preamble phase, it is possible to walk up a received pattern to find the front or leading edge of the pulse. In some examples, upon detection of a first pulse, a window, which in some cases may be asymmetric, may be established for the next pulse so as to enable the window to be re-centered. The window width may be adjusted (e.g., narrowed) as more pulses are detected without synchronous earlier echoes until the original first arrival is determined.

Alternatively or additionally, in order to mitigate random noise effects on time stamp generation, a plurality of received pulses (e.g., pulses in the synch pattern) may be used to determine a timestamp. Thus, in cases where a window is established as described herein, the window may be used to identify or otherwise determine multiple pulses (e.g., eight) within a synch pattern so as to generate time measurements (e.g., at a 1 nsec resolution) and to combine those time measurements by taking on average of the measurements, a rounded average of the time measurements or the like, to determine a high resolution timestamp for the packet.

Example Target Location System

FIG. 1 shows a timing diagram 100 for an RTLS tag transmission (TX) in a high-resolution TOA determination system, in accordance with example embodiments of the present invention. The timing diagram 100 comprises a TX clock 101, a preamble 110, and a data packet 120, which as presented in FIG. 1, includes the preamble 110 as a subset of the data packet 120. The preamble 110 is comprised of a transmit (TX) series of pulses 111T, wherein the TX series of pulses 111T are equally spaced in time, in accordance with a period associated with the TX clock 101. In some examples, the period associated with the TX clock is approximately 1 μsec, whereby the TX clock 101 operates at a frequency of 1 MHz.

Each individual TX pulse 111T' in the TX series of pulses 111T is identical. In some examples, the TX pulse 111T' comprises a 6 GHz carrier wave modulated by a 2.0 nsec pulse, or rectangle function (rect). In some examples, the TX pulse 111T' is additionally shaped at a receiver by a transmit and receive antenna and any electronics associated with an amplification or pre-amplification of the TX pulse 111T', in conjunction with the high-resolution TOA determination system. In some examples, the TX pulse 111T' shape at the receiver, denoted RX pulse 111R', may be consistent with a function $\sim t\, e^{-t/\tau}$. The TX series of pulses 111T is used to provide for an iterative windowing function, an adjustable timing window 200, described in FIG. 2.

The data packet 120 comprises at least the following data words: the aforementioned preamble 110, a sync code 112, a header 120A, a transmit identification (TX ID) 120B, and a CRC word 120C. The sync code 112 represents a known sequence of 1's and 0's. In other examples, the 1's and 0's may be distributed in other ways. In some examples, the sync code 112 may be 16 bits long. The sync code 112 consists primarily of 1's, which represent the TX pulses 111T'-rather than 0's, which represent 'blanks,' or no pulse. The sync code 112 is used to provide for a registration code 350 in response to each of the TX pulses 111T' associated with the sync code 112, whereby the registration code 350 provides for a record of a detection of the sync code 112 in a receiver (RX) fine timing window function 300, described in FIG. 3.

The data packet 120 is transmitted by the RTLS tag transmitter, in some examples, continually and periodically. In some examples, the transmission of the data packet 120 is initiated immediately at the end of the 1 μsec period associated with a final transmit bit, in this example the CRC 120C least significant bit. In some examples, a waiting period between successive transmissions is established.

In some embodiments, the data packet 120 is 112 bits long, wherein the bit distribution may be as follows: the preamble 110 (e.g., 32 bits), the sync code 112 (e.g., 16 bits), the header 120A (e.g., 16 bits), the TX ID 120B (e.g., 32 bits), and the CRC 120C (e.g., 16 bits). In this example, a transmission time associated with the data packet 120 and the aforementioned 1 MHz data rate is 112 μsec. In other examples, the data packet 120 may consist of a plurality of data long words 120B', immediately following the TX ID 120B and preceding the CRC 120C, resulting in a longer data packet 120. In some embodiments, the plurality of data long words 120B' are each 32 bits long.

In some embodiments, the plurality of data long words 120B' may include one or more of a temperature, an acceleration, and an attitude of rotational displacement. In some embodiments, the plurality of data long words 120B' may include a 'Query' command to the receiver, wherein the RTLS tag transmitter, in this example, is equipped with a 125 KHz receiver and associated firmware to decode a response.

FIG. 2 shows a timing diagram for an adjustable timing window function 200, in accordance with example embodiments of the present invention. FIG. 2 comprises the TX clock 101 and the TX series of pulses 111T associated with preamble 120, as presented in for the RTLS tag transmission (TX) 100, shown in FIG. 1, and an RX clock 201 and an RX clock timing diagram 202. A received (RX) pulse train 211R is comprised of a series of the RX pulses 111R', corresponding to the TX series of pulses 111T, and is synchronized to the RX clock 201, which is resident at an example receiver in the receiver grid. An RX pulse signature 212, representing an earliest pulse 215 and a series of echoes 216A-B and possible noise pulses 217, as shown in FIG. 2, is associated with the RX clock timing diagram 202, and is also associated with the corresponding TX pulse 111T'.

The adjustable timing window function 200, presented in FIG. 2, is comprised of a series of detection windows 220, comprising wide detection windows 221-230 and narrow detection windows 231-233, and an associated set of functions to adaptively position the series of wide and narrow detection windows 221-233 to center the RX pulse 111R' in the corresponding window. In some embodiments, as in the present example shown in FIG. 2, there are ten wide detection windows 221-230. In some embodiments, as in the present example shown in FIG. 2, there are three narrow detection windows 231-233. For notation convenience, the last window in the series of fine and narrow detection windows 221-233 is called a final detector window 233.

In an example embodiment, as shown in FIG. 2, a first detection window 221 may be centered at 480 nsec, for example, with a width of 150 nsec. The center of the first detector window is a function of a first registered detection, wherein the present example registers a first registered detection at a second echo 216B of the RX pulse 111R'. The width of the first detection window 221 may be a function of an expected distance from the RTLS tag transmitter to the receiver.

The first detection window 221 may be adaptively updated by a second detection window 222 as provided by evidence of a second registered detection, wherein the present example registers a second registered detection at a first echo 216A of the RX pulse 111R'. In the example embodiment, the second detection window 222 may be centered at 460 nsec with a width of 150 nsec. Similarly, the second detection window 222 may be adaptively updated by a third detection window 223 as provided by evidence of a third registered detection, wherein the present example registers a third registered detection at an earliest pulse 215 of the RX pulse 111R'. In the example embodiment, the third detection window 223 may be centered at 415 nsec with a width of 150 nsec.

The series of wide detection windows 221-230 continue to be adaptively updated by the registered detections of RX pulses 111R' that comprise the RX pulse train 211R corresponding to the TX series of pulses 111T in the preamble 110. In some examples, a final wide detector window 230 may be declared after a detection of ten RX pulses 111R'. At which point a final wide detector window 230 is determined, the registered detections for the series of wide detection windows 221-230 ends, and the series of narrow detection windows 231-233 implemented.

A first narrow detection window 231 is centered at the center of the final wide detection window 230, as shown in FIG. 2. The width of the first narrow detection window 231 is 30 nsec, in some examples. Note that, as FIG. 2 demonstrates, a timing shift may result with the registered detection of the RX pulse 111R' associated with the first narrow detection window 231. The placement of the first narrow detection window 231, centered at 425 nsec, graphically represents such a shift, as the earliest pulse 215 associated with the RX pulse 111R' appears to be registered along the RX clock timing diagram 202 closer to 415 nsec.

Each of the series of narrow detection windows 231-233 are comprised of three 10 nsec, disjoint timing windows 231A-C, 232A-C, and 233A-C. Detections for the RX pulses 111R' that comprise the RX pulse train 211R are registered in parallel in each of the three disjoint timing windows 231A-C, for example, to determine to which of the three disjoint timing windows 231A-C the detection should be assigned. The purpose of the series of narrow detection windows 231-233 is to ensure that the final detection associated with the final RX pulse 111R' in the RX pulse train 211R is registered in a final center disjoint timing window 233B associated with the final detector window 233. A slide narrow window function 235 to slide the series of narrow detection windows 231-233 left and right in 10 nsec increments, for example, is provided as a method to achieve the aforementioned requirement, and as such the final detection associated with the final RX pulse 111R' in the RX pulse train 211R is registered in the center of the final detector window 233.

The adjustable timing window function 200, shown in FIG. 2, may be implemented as a first feedback loop, wherein a pulse detector resides in the forward feed and the slide window function 235 may comprise the feedback. The pulse detector may determine whether or not a pulse detection is registered in the currently prescribed disjoint timing windows 231A-C, for example, for any of the series of narrow detection windows 231-233. As a function of the detections registered in the currently prescribed disjoint timing windows 231A-C, for example, a feedback function may determine which direction a shift is to be made, and in some examples, what is the magnitude of the prescribed shift, if different from a default shift value of 10 nsec, for example.

As previously stated, the default shift magnitude is equal to the shift magnitude presented in the example given in FIG. 2, that of 10 nsec, for example. A minimum shift magnitude may also be given (e.g., 10 nsec). Larger shift magnitudes may be incorporated, dependent on the detection algorithm. As one example, a detection algorithm that may determine multiple echoes 216A-B as registered in a relatively wide detector window may include logic to 'skip' left over several reflections at once to expedite the capture of the earliest pulse 215, the line-of-sight channel. In this example, a registration of multiple echoes 216A-B in the relatively wide detector window may be determined by the relative amplitude of the registered detections.

The situation described in the present example, where multiple echoes 216A-B—or reflections—may be registered in the same detector window is particular in reflective environments, environments surrounded by conductors. By contrast, it is unlikely that both the earliest pulse 215, the line-of-sight channel, and an echo 216A-B—or reflection— might arrive within the limits of the same wide detector window 221-230, as the time difference between the earliest pulse 215, the line-of-sight channel, and the echo 216A-B, the reflection, may be on the order of tens of feet, or greater than 150 nsec difference in TOA, the width of the wide detector window 221-230 in this example.

Further, the detectors themselves may comprise several functions that may affect an improved detection resolution. For example, the detectors may be assigned a detection level or a threshold level that may determine whether the magnitude of the earliest pulse 215, one or more of the echoes 216A-B, or a noise pulse 217 is in fact a signal, or just a low-level background noise interference. Alternatively or additionally, for example, a signal-to-noise (SNR) level may be monitored dynamically, and the detection threshold level adjusted accordingly. In a further advancement, a relative strength of the signal may be monitored dynamically, whereby the strength of the signal, in conjunction with a TOA determination associated with the signal, may comprise two inputs to an automatic gain control (AGC) for either a pre-amplification or an amplification of the signal.

FIG. 3 shows a timing diagram for a receiver (RX) fine timing window function 300, in accordance with example embodiments of the present invention. FIG. 3 comprises the final detector window 233 and the three 10 nsec disjoint timing windows 233A-C associated with the final detector window 233, and a parallel set of fine detector windows 340A-E. The final detector window 233 and the fine detector windows 340A-E are synchronized with the RX clock timing diagram 202, as shown in FIG. 2. The leading edge of a first fine detector window 340A is synchronous with the leading edge of the final center disjoint timing window 233B associated with the final detector window 233. The RX fine timing window function 300 comprises registering a series of detections in the parallel set of fine detector windows 340A-E, each associated with the final center disjoint timing window 233B. The series of detections in the parallel set of fine detector windows 340A-E provides for a detection record of the sync code 112, the sequence of 1's and 0's TX pulses 111T' transmitted by the RTLS tag transmitter.

The registering the series of detections in the parallel set of fine detector windows 340, each associated with the final center disjoint timing window 233B, comprises a generation of the registration code 350 which codifies the detections of the RX pluses 111R' associated with the sync code 112 TX pulses 111T'. The registration code 350 codifies the detections with respect to each of the fine detector windows 340A-E, as shown in the example given in FIG. 3. As demonstrated for the present example, each successive fine detector window 340A-E overlaps the previous fine detector window 340A-E by 1 nsec, and each of the fine detector windows 340A-E in the parallel set of fine detector windows 340A-E is 5 nsec wide with a period of 10 nsec, as determined by the RX clock 201, running at a frequency of 100 MHz.

As represented by the registration code 350 for the present example, a detection of the RX pulse 111R' associated with the corresponding sync code 112 TX pulse 111T' is registered in each of the fine detector windows 340A-E. As such, it is inferred, in the present example, that the TOA for the RX pulse 111R' is 414 nsec after the leading edge of the RX clock 201.

FIG. 4 shows a timing diagram for a receiver (RX) sub-window resolution function 400, in accordance with example embodiments of the present invention. FIG. 4 comprises the final center disjoint timing window 233B and the parallel set of fine detector windows 340A-E. To reiterate, the fine detector windows 340A-E are synchronized with the RX clock timing diagram 202, as shown in FIG. 2. That is, the leading edge of a first fine detector window 340A is synchronous with the leading edge of the final center disjoint timing window 233B and with the leading edge of the RX clock 201. The series of detections in the parallel set of fine detector windows 340A-E provides for a detection record of each of the RX pulses 111R' associated with the TX pulses 111T' that comprise the sync code 112, the detections recorded in the registration codes 350.

FIG. 4 presents a collection of RX pulses 111R' associated with the sync code 112, wherein the collection of pulses are identified as RX pulses 1-8. The associated registration codes 350, one registration code for each pulse, which codifies the detections of the collection RX pluses 111R', RX pulses 1-8, is also shown. In the example presented in FIG. 4, the TX clock 101 may be running at a slightly higher frequency than the RX clock 201. As such, each successive RX pulse 111R', RX pulses 1-8, effectively 'slips' to the left with respect to the RX clock 201, as shown in the RX sub-window resolution functional drawing 400. Or alternatively, the leading edge of the center disjoint timing window 233B and the leading edge of the first fine detector window 340A, and the RX clock 201 itself, effectively shift to the right with respect to the successive pulses 1-8.

The results from the registration codes 350 clearly demonstrate a detection of an RX pulse 6, associated with a fourth sync code 112 TX pulse 111T', as the first RX pulse to change detection registration; that is, to be detected or undetected in a new window, namely the fine detector window 340E. As such, the TOA is determined for the RX pulse 6 nearest to the leading edge of the fine detector window 340E. The RX pulse 6 is designated with a TOA estimate to be 4 nsec greater than the leading edge of the final center disjoint timing window 233B, which is registered at 410 nsec. Consequently, the RX pulse 6 is designated with a TOA estimate to be 414 nsec with respect to the RX clock 201.

More generally, a TOA averaging function may be used to further the sub-window resolution function 400. The TOA averaging function may effectively take differences in the TOAs of successive RX pulses 1-8, for example, whereby the TOA, as demonstrated previously, is a function of the leading edge registration of the final center disjoint window 233B and an associated registration code 350. The TOA differences, like the TOAs themselves, will register a transition as successive RX pulses 1-8 exhibit a change in detection registration, just as was the case demonstrated previously.

By assigning registration codes 350 that account for transitions between the fine detector windows 233A-C, a TOA numerical average may be constructed to assign a TOA with sub-window resolution. In the present example, a TOA average may be constructed whereby RX pulses 1-5 are assigned a weight equal to 4 nsec greater than the leading edge of the final center disjoint timing window 233B, and RX pulses 6-8 are assigned a weight equal to 3 nsec greater than the leading edge of the final center disjoint timing window 233B. As such, a TOA average is calculated as: 410 nsec+($5/8 \times 14$ nsec)+($3/8 \times 13$ nsec)=$414 5/8$ nsec.

The change in the relative position of the RX pulses 1-8 with respect to the RX clock 201, as shown in FIG. 4, is in some examples directly attributable to the asynchronous TX 101 and RX clocks 201. That is, the TX clock 101 frequency and the RX clock 201 frequency are not equal. The frequency difference between the TX clock 101 and the RX clock 201 may be due to a clock drift of at least one or both of the TX clock 101 and the RX clock 201. In another embodiment, the TX clock 101 and the RX clock 201 may be purposefully detuned in order to take advantage of the sub-window resolution function 400 presented in FIG. 4. In the latter case, it may be possible, given very stable detuned TX 101 and RX clocks 201 that an error bound, the sub-window accuracy achieved by the sub-window resolution function 400, is itself stable and predictable.

Example Real Time Locating System

FIG. 5 illustrates an exemplary locating system 500 useful for calculating a location by an accumulation of location data or time of arrivals (TOAs) at a central processor/hub 11, whereby the TOAs represent a relative time of flight (TOF) from RTLS tags 12a-f as recorded at each receiver 13a-1 (e.g., UWB reader, etc.). A timing reference clock is used, in some examples, such that at least a subset of the receivers 13a-1 may be synchronized in frequency, whereby the relative TOA data associated with each of the RTLS tags 12a-f may be registered by a counter associated with at least a subset of the receivers 13a-1. In some examples, a reference tag 14a-b, preferably a UWB transmitter, positioned at known coordinates, is used to determine a phase offset between the counters associated with at least a subset of the of the receivers 13a-1. The RTLS tags 12a-f and the reference tags 14a-b reside in an active RTLS field 18. The systems described herein may be referred to as either "multilateration" or "geolocation" systems, terms that refer to the process of locating a signal source by solving an error minimization function of a location estimate determined by the difference in time of arrival (DTOA) between TOA signals received at multiple receivers 13a-1.

In some examples, the system comprising at least the tags 12a-f and the receivers 13a-1 is configured to provide two dimensional and/or three dimensional precision localization (e.g., subfoot resolutions), even in the presence of multipath interference, due in part to the use of short nanosecond duration pulses whose TOF can be accurately determined using detection circuitry, such as in the receivers 13a-1, which can trigger on the leading edge of a received waveform. In some examples, this short pulse characteristic allows necessary data to be conveyed by the system at a higher peak power, but lower average power levels, than a wireless system configured for high data rate communications, yet still operate within local regulatory requirements.

In some examples, to provide a preferred performance level while complying with the overlap of regulatory restrictions (e.g. FCC and ETSI regulations), the tags 12a-f may operate with an instantaneous −3 dB bandwidth of approximately 400 MHz and an average transmission below 187 pulses in a 1 msec interval, provided that the packet rate is sufficiently low. In such examples, the predicted maximum range of the system, operating with a center frequency of 6.55 GHz, is roughly 200 meters in instances in which a 12 dbi directional antenna is used at the receiver, but the projected range will depend, in other examples, upon receiver antenna gain. Alternatively or additionally, the range of the system allows for one or more tags 12a-f to be detected with one or more receivers positioned throughout a football stadium used in a professional football context. Such a configuration advantageously satisfies constraints applied by regulatory bodies related to peak and average power densities (e.g., effective isotropic radiated power density ("EIRP")), while still optimizing system performance related to range and interference. In further examples, tag transmissions with a −3 dB bandwidth of approximately 400 MHz yields, in some examples, an instantaneous pulse width of roughly 2 nanoseconds that enables a location resolution to better than 30 centimeters.

Referring again to FIG. 5, the object to be located has an attached tag 12a-f, preferably a tag having a UWB transmitter, that transmits a burst (e.g., multiple pulses at a 1 Mb/s burst rate, such as 112 bits of On-Off keying (OOK) at a rate of 1 Mb/s), and optionally, a burst comprising an information packet utilizing OOK that may include, but is not limited to, ID information, a sequential burst count or other desired information for object or personnel identification, inventory control, etc. In some examples, the sequential burst count (e.g., a packet sequence number) from each tag 12a-f may be advantageously provided in order to permit, at a Central Processor/Hub 11, correlation of TOA measurement data from various receivers 13a-1.

In some examples, the tag 12a-f may employ UWB waveforms (e.g., low data rate waveforms) to achieve extremely fine resolution because of their extremely short pulse (i.e., sub-nanosecond to nanosecond, such as a 2 nsec (1 nsec up and 1 nsec down)) durations. As such, the information packet may be of a short length (e.g. 112 bits of OOK at a rate of 1 Mb/sec, in some example embodiments), that advantageously enables a higher packet rate. If each information packet is unique, a higher packet rate results in a higher data rate; if each information packet is transmitted repeatedly, the higher packet rate results in a higher packet repetition rate. In some examples, higher packet repetition rate (e.g., 12 Hz) and/or higher data rates (e.g., 1 Mb/sec, 2 Mb/sec or the like) for each tag may result in larger datasets for filtering to achieve a more accurate location estimate. Alternatively or additionally, in some examples, the shorter length of the information packets, in conjunction with other packet rate, data rates and other system requirements, may also result in a longer battery life (e.g., 7 years battery life at a transmission rate of 1 Hz with a 300 mAh cell, in some present embodiments).

Tag signals may be received at a receiver directly from RTLS tags, or may be received after being reflected en route. Reflected signals travel a longer path from the RTLS tag to the receiver than would a direct signal, and are thus received later than the corresponding direct signal. This delay is known as an echo delay or multipath delay. If reflected signals are sufficiently strong enough to be detected by the receiver, they can corrupt a data transmission through inter-symbol interference. In some examples, the tag 102 may employ UWB waveforms to achieve extremely fine resolution because of their extremely short pulse (e.g., 2 nsec) durations. Furthermore, signals may comprise short information packets (e.g., 112 bits of OOK) at a somewhat high burst data rate (1 Mb/sec, in some example embodiments), that advantageously enable packet durations to be brief (e.g. 112 microsec) while allowing inter-pulse times (e.g., 998 nsec) sufficiently longer than expected echo delays, avoiding data corruption.

Reflected signals can be expected to become weaker as delay increases due to more reflections and the longer distances traveled. Thus, beyond some value of inter-pulse time (e.g., 998 nsec), corresponding to some path length difference (e.g., 299.4 m.), there will be no advantage to further increases in inter-pulse time (and, hence lowering of burst data rate) for any given level of transmit power. In this manner, minimization of packet duration allows the battery life of a tag to be maximized, since its digital circuitry need only be active for a brief time. It will be understood that different environments can have different expected echo delays, so that different burst data rates and, hence, packet durations, may be appropriate in different situations depending on the environment.

Minimization of the packet duration also allows a tag to transmit more packets in a given time period, although in practice, regulatory average EIRP limits may often provide an overriding constraint. However, brief packet duration also reduces the likelihood of packets from multiple tags overlapping in time, causing a data collision. Thus, minimal packet duration allows multiple tags to transmit a higher aggregate number of packets per second, allowing for the largest number of tags to be tracked, or a given number of tags to be tracked at the highest rate.

In one non-limiting example, a data packet length of 112 bits (e.g., OOK encoded), transmitted at a data rate of 1 Mb/sec (1 MHz), may be implemented with a transmit tag repetition rate of 1 transmission per second (1 TX/sec). Such an implementation may accommodate a battery life of up to seven years, wherein the battery itself may be, for example, a compact, 3-volt coin cell of the series no. BR2335 (Rayovac), with a battery charge rating of 300 mAhr. An alternate implementation may be a generic compact, 3-volt coin cell, series no. CR2032, with a battery charge rating of 220 mAhr, whereby the latter generic coin cell, as can be appreciated, may provide for a shorter battery life.

Alternatively or additionally, some applications may require higher transmit tag repetition rates to track a dynamic environment. In some examples, the transmit tag repetition rate may be 12 transmissions per second (12 TX/sec). In such applications, it can be further appreciated that the battery life may be shorter.

The high burst data transmission rate (e.g., 1 MHz), coupled with the short data packet length (e.g., 112 bits) and the relatively low repetition rates (e.g., 1 TX/sec), provide for two distinct advantages in some examples: (1) a greater number of tags may transmit independently from the field of tags with a lower collision probability, and/or (2) each independent tag transmit power may be increased, with proper consideration given to a battery life constraint, such that a total energy for a single data packet is less that a regulated average power for a given time interval (e.g., a 1 msec time interval for an FCC regulated transmission).

Alternatively or additionally, additional sensor telemetry data may be transmitted from the tag 12$a$-$f$ to provide the receivers 13$a$-1 with information about the environment and/or operating conditions of the tag. For example, the tag may transmit a temperature to the receivers 13$a$-1. Such information may be valuable, for example, in a system involving perishable goods or other refrigerant requirements. In this example embodiment, the temperature may be transmitted by the tag at a lower repetition rate than that of the rest of the data packet. For example, the temperature may be transmitted from the tag to the receivers at a rate of one time per minute (e.g., 1 TX/min.), or in some examples, once every 720 times the data packet is transmitted, whereby the data packet in this example is transmitted at an example rate of 12 TX/sec.

Alternatively or additionally, the tag 12$a$-$f$ may be programmed to intermittently transmit data to the receivers 13$a$-1 in response to a signal from a magnetic command transmitter (not shown). The magnetic command transmitter may be a portable device, functioning to transmit a 125 kHz signal, in some example embodiments, with a range of approximately 15 feet or less, to one or more of the tags 12$a$-$f$. In some examples, the tags 12$a$-$f$ may be equipped with at least a receiver tuned to the magnetic command transmitter transmit frequency (e.g., 125 kHz) and functional antenna to facilitate reception and decoding of the signal transmitted by the magnetic command transmitter.

In some examples, one or more other tags, such as a reference tag 14$a$-$b$, may be positioned within and/or about a monitored region. In some examples, the reference tag 14$a$-$b$ may be configured to transmit a signal that is used to measure the relative phase (e.g., the count of free-running counters) of non-resettable counters within the receivers 13$a$-1.

One or more (e.g., preferably four or more) receivers 13$a$-1 are also positioned at predetermined coordinates within and/or around the monitored region. In some examples, the receivers 13$a$-1 may be connected in a "daisy chain" 19 fashion to advantageously allow for a large number of receivers 13$a$-1 to be interconnected over a significant monitored region in order to reduce and simplify cabling, provide power, and/or the like. Each of the receivers 13$a$-1 includes a receiver for receiving transmissions, such as UWB transmissions, and preferably, a packet decoding circuit that extracts a time of arrival (TOA) timing pulse train, transmitter ID, packet number, and/or other information that may have been encoded in the tag transmission signal (e.g., material description, personnel information, etc.) and is configured to sense signals transmitted by the tags 12$a$-$f$ and one or more reference tags 14$a$-$b$.

Each receiver 13$a$-1 includes a time measuring circuit that measures times of arrival (TOA) of tag bursts, with respect to its internal counter. The time measuring circuit is phase-locked (e.g., phase differences do not change and therefore respective frequencies are identical) with a common digital reference clock signal distributed via cable connection from a Central Processor/Hub 11 having a central timing reference clock generator. The reference clock signal establishes a common timing reference for the receivers 13$a$-1. Thus, multiple time measuring circuits of the respective receivers 13$a$-1 are synchronized in frequency, but not necessarily in phase. While there typically may be a phase offset between any given pair of receivers in the receivers 13$a$-1, the phase offset is readily determined through use of a reference tag 14$a$-$b$. Alternatively or additionally, each receiver may be synchronized wirelessly via virtual synchronization without a dedicated physical timing channel.

In some example embodiments, the receivers 13a-1 are configured to determine various attributes of the received signal. Since measurements are determined at each receiver 13a-1, in a digital format, rather than analog in some examples, signals are transmittable to the Central Processor/Hub 11. Advantageously, because packet data and measurement results can be transferred at high speeds to a receiver memory, the receivers 13a-1 can receive and process tag (and corresponding object) locating signals on a nearly continuous basis. As such, in some examples, the receiver memory allows for a high burst rate of tag events (i.e., information packets) to be captured.

Data cables or wireless transmissions may convey measurement data from the receivers 13a-1 to the Central Processor/Hub 11 (e.g., the data cables may enable a transfer speed of 2 Mbps). In some examples, measurement data is transferred to the Central Processor/Hub at regular polling intervals.

As such, the Central Processor/Hub 11 determines or otherwise computes tag location (i.e., object location) by processing TOA measurements relative to multiple data packets detected by the receivers 13a-1. In some example embodiments, the Central Processor/Hub 11 may be configured to resolve the coordinates of a tag using nonlinear optimization techniques.

In some examples, TOA measurements from multiple receivers 13a-1 are processed by the Central Processor/Hub 11 to determine a location of the transmit tag 12a-f by a differential time-of-arrival (DTOA) analysis of the multiple TOAs. The DTOA analysis includes a determination of tag transmit time $t_0$, whereby a time-of-flight (TOF), measured as the time elapsed from the estimated tag transmit time $t_0$ to the respective TOA, represents graphically the radii of spheres centered at respective receivers 13a-1. The distance between the surfaces of the respective spheres to the estimated location coordinates ($x_0$, $y_0$, $z_0$) of the transmit tag 12a-f represents the measurement error for each respective TOA, and the minimization of the sum of the squares of the TOA measurement errors from each receiver participating in the DTOA location estimate provides for the location coordinates ($x_0$, $y_0$, $z_0$) of the transmit tag and of that tag's transmit time $t_0$.

In some examples, the system described herein may be referred to as an "over-specified" or "over-determined" system. As such, the Central Processor/Hub 11 may calculate one or more valid (i.e., most correct) locations based on a set of measurements and/or one or more incorrect (i.e., less correct) locations. For example, a location may be calculated that is impossible due the laws of physics or may be an outlier when compared to other calculated locations. As such one or more algorithms or heuristics may be applied to minimize such error.

The starting point for the minimization may be obtained by first doing an area search on a coarse grid of x, y and z over an area defined by the user and followed by a localized steepest descent search. The starting location for this algorithm is fixed, in some examples, at the mean position of all active receivers. No initial area search is needed, and optimization proceeds through the use of a Davidon-Fletcher-Powell (DFP) quasi-Newton algorithm in some examples. In other examples, a steepest descent algorithm may be used.

One such algorithm for error minimization, which may be referred to as a time error minimization algorithm, may be described in Equation 1:

$$\epsilon = \Sigma_{j=1}^{N}[[(x-x_j)^2+(y-y_j)^2+(z-z_j)^2]^{1/2}-c(t_j-t_0)]^2 \quad (1)$$

Where N is the number of receivers, c is the speed of light, ($x_j$, $y_j$, $z_j$) are the coordinates of the $j^{th}$ receiver, $t_j$ is the arrival time at the $j^{th}$ receiver, and $t_0$ is the tag transmit time. The variable $t_0$ represents the time of transmission. Since $t_0$ is not initially known, the arrival times, $t_j$, as well as $t_0$, are related to a common time base, which in some examples, is derived from the arrival times. As a result, differences between the various arrival times have significance for determining location as well as $t_0$.

The optimization algorithm to minimize the error $\epsilon$ in Equation 1 may be the Davidon-Fletcher-Powell (DFP) quasi-Newton algorithm, for example. In some examples, the optimization algorithm to minimize the error $\epsilon$ in Equation 1 may be a steepest descent algorithm. In each case, the algorithms may be seeded with an initial location estimate (x, y, z) that represents the two-dimensional (2D) or three-dimensional (3D) mean of the positions of the receivers 13a-1 that participate in the tag location determination.

In some examples, the RTLS system comprises a receiver grid, whereby each of the receivers 13a-1 in the receiver grid keeps a receiver clock that is synchronized, with an initially unknown phase offset, to the other receiver clocks. The phase offset between any receivers may be determined by use of a reference tag that is positioned at a known coordinate position ($x_T$, $y_T$, $z_T$). The phase offset serves to resolve the constant offset between counters within the various receivers 13a-1, as described below.

In further example embodiments, a number N of receivers 13a-1 {$R_j$: j=1, ..., N} are positioned at known coordinates ($x_{R_j}$, $y_{R_j}$, $z_{R_j}$) which are respectively located at distances $d_{R_j}$ from a reference tag 14a-b, such as given in Equation 2:

$$d_{R_j}=\sqrt{(x_{R_j}-x_T)^2+(y_{R_j}-y_T)^2+(z_{R_j}-z_T)^2} \quad (2)$$

Each receiver $R_j$ utilizes, for example, a synchronous clock signal derived from a common frequency time base, such as clock generator. Because the receivers are not synchronously reset, an unknown, but constant offset $O_j$ exists for each receiver's internal free running counter. The value of the constant offset $O_j$ is measured in terms of the number of fine resolution count increments (e.g., a number of nanoseconds for a one nanosecond resolution system).

The reference tag is used, in some examples, to calibrate the radio frequency locating system as follows: The reference tag emits a signal burst at an unknown time $\tau_R$. Upon receiving the signal burst from the reference tag, a count $N_{R_j}$ as measured at receiver $R_j$ is given in Equation 3 by:

$$N_{R_j}=\beta\tau_R+O_j+\beta d_{R_j}/c \quad (3)$$

Where c is the speed of light and $\beta$ is the number of fine resolution count increments per unit time (e.g., one per nanosecond). Similarly, each object tag $T_i$ of each object to be located transmits a signal at an unknown time $\tau_i$ to produce a count $N_{ij}$, as given in Equation 4:

$$N_{ij}=\beta\tau_i+O_j+\beta d_{ij}/c \quad (4)$$

At receiver $R_j$ where $d_{ij}$ is the distance between the object tag $T_i$ and the receiver 13a-1 $R_j$. Note that $\tau_i$ is unknown, but has the same constant value for all receivers. Based on the equalities expressed above for receivers $R_j$ and $R_k$ and given the reference tag 14a-b information, phase offsets expressed as differential count values are determined as given in Equations 5a-b:

$$N_{R_j} - N_{R_k} = (O_j - O_k) + \beta\left(\frac{d_{R_j}}{c} - \frac{d_{R_k}}{c}\right) \quad (5a)$$

Or, $$(O_j - O_k) = (N_{R_j} - N_{R_k}) - \beta\left(\frac{d_{R_j}}{c} - \frac{d_{R_k}}{c}\right) = \Delta_{jk} \quad (5b)$$

Where $\Delta_{jk}$ is constant as long as $d_{R_j} - d_{R_k}$ remains constant, (which means the receivers and reference tag are fixed and there is no multipath situation) and $\beta$ is the same for each receiver. Note that $\Delta_{j_k}$ is a known quantity, since $N_{R_j}$, $N_{R_k}$, $\beta$, $d_{R_j}/c$, and $d_{R_k}/c$ are known. That is, the phase offsets between receivers $R_j$ and $R_k$ may be readily determined based on the reference tag 14a-b transmissions. Thus, again from the above equations, for a tag 12a-f ($T_i$) transmission arriving at receivers $R_j$ and $R_k$, one may deduce the following Equations 6a-b:

$$N_{i_j} - N_{i_k} = (O_j - O_k) + \beta\left(\frac{d_{i_j}}{c} - \frac{d_{i_k}}{c}\right) = \Delta_{jk} + \beta\left(\frac{d_{i_j}}{c} - \frac{d_{i_k}}{c}\right) \quad (6a)$$

Or, $$d_{i_j} - d_{i_k} = (c/\beta)[N_{i_j} - N_{i_k} - \Delta_{jk}] \quad (6b)$$

Each arrival time, $t_j$, can be referenced to a particular receiver (receiver "1") as given in Equation 7:

$$t_j = \frac{1}{\beta}(N_j - \Delta_{j1}) \quad (7)$$

The minimization, described in Equation 1, may then be performed over variables (x, y, z, $t_0$) to reach a solution (x', y', z', $t_0$').

Example Receiver Architecture

FIG. 6 illustrates an exemplary receiver 13a-1 in a UWB receiver system 600 comprising a UWB receiver that may be configured in accordance with some embodiments of the present invention. In an example embodiment, data packets 120 are transmitted to the receivers 13a-1 and intercepted by UWB antenna 21. A UWB receiver 22 is provided at each receiver 13a-1. The UWB receiver can, for example, be designed in accordance with the system described in commonly-owned U.S. Pat. No. 5,901,172, which is incorporated by reference herein in its entirety.

UWB receiver 22, provided for at receivers 13a-1, allows for an analog signal stream that is digitized, then processed by a UWB TOA and data recovery circuits 24. The analog stream is digitized by up to three or more parallel, concurrent, independent analog-to-digital convertors (ADCs) functioning with three distinct threshold levels, resulting in up to three or more digital data streams 23A-C that are sent to the UWB TOA and data recovery circuits 24. In some embodiments, the threshold levels applied to the analog signal stream in the UWB receiver 22 are a function of a signal-to-noise ratio (SNR) present in the communication channel. In some embodiments, the threshold levels are set dynamically as a function of one or more of an antenna preamp gain and an estimated RTLS tag range.

The UWB TOA and data recovery circuits 24 perform as many as three or more parallel, concurrent, identical signal processing functions on the three or more digital data streams 23A-C. The three or more UWB TOA and data recovery circuits 24 may be configured to receive data packets 120 that correspond to RTLS tags 12a-f. The UWB TOA and data recovery circuits 24 may provide for a packet framing and extraction function as part of the data recovery circuit, whereby an RTLS tag 12a-f identification may be extracted. The RTLS identification may be extracted by the TX identification field 120B of the data packet 120, as described previously. In some embodiments, the UWB TOA and data recovery circuits 24 are implemented by field programmable gate arrays (FPGAs). The TOA and extracted data packet is sent by TOA line 25 to an arbitrate/buffer function 26.

The arbitrate/buffer function 26 effectively selects the TOA line 25 data provided by the UWB TOA and data recovery circuits 24. The arbitrate/buffer function 26 selects the TOA line 25 that converges to the earliest TOA from the up to three or more TOA and data recovery circuits 24 driven by the digital data stream 23A-C. The arbitrate/buffer function 26 provides for a series of serial messages, or tag message 27, to send to a tag queue function 28, whereby each of the tag messages 27 is identified by an RTLS tag 12a-f and an associated TOA.

The tag queue function 28 provides for a formatting and ordering of the collection of RTLS tag identifiers and TOAs, effectively a first-in first-out (FIFO) memory buffer awaiting a transmission to the central processor/hub 11. Upon a tag queue function 28 trigger, a tag data packet 29 is sent to a formatting and data coding/decoding function 30 that, in turn, repackages the tag data packet 29 and transmits a synchronous tag data packet 30B to the central processor/hub 11.

The synchronous tag data packet 30B transmitted by the formatting and data coding/decoding function 30 to the central processor/hub 11 is synchronized by a 10 MHz receiver clock 40, received from the previous receiver clock in the "daisy chain" 19, and transmitted to the next receiver clock in the "daisy chain" 19 following a synchronous frequency up/down convert. The receiver clock 40 drives a phase-locked loop (PLL) 41, whereby a frequency divider in a feedback loop in conjunction with a voltage-controlled oscillator (VCO) provides for a 100 MHz receiver clock 42-43 that is synchronized in phase to the 10 MHz receiver clock 40. The 100 MHz receiver clock 42 is provided to synchronize all logic blocks in the UWB receiver 13a-1 and to provide for a TOA coarse time 45, sent by line 46 to the TOA and data recovery circuits 24 to be used in the TOA determination. The 100 MHz receiver clock 43 provides for the parallel set of fine detector windows 340, a basis of a set of receiver timing windows used to capture and register pulses transmitted by RTLS tags 12a-f in the TOA determination, as described previously with respect to FIG. 3.

A second function of the formatting and data coding/decoding function 30 is a buffering, reformatting, and repeating of a central processor data 30A-B received and transmitted between the receiver 13a-1 and the central processor/hub 11 via the "daisy chain" 19 receiver network. The central processor data 30A-B received and transmitted from and to the formatting and data coding/decoding function 30 may provide for a series of commands that are decoded at a command decoder 44 to trigger receiver functions. A non-exhaustive list of such functions may include the following: an auto/manual control function 20, a series of telemetry functions 60, and the arbitrate/buffer function 26 to prune a data queue and to manage, delete, and reorder the data queue. The auto/manual control function 20 may be commanded—from manual mode- to report sensor information such as temperature and other telemetry data recorded in the telemetry function 60, and may be commanded to manually adjust one or more of an antenna preamp gain and the previously described threshold levels at the UWB receiver 22.

A power supply 50 may be configured to power the receiver 13a-1 by way of an AC-DC convertor, whereby the AC power may be provided as an input from the central processor/hub 11, shown in FIG. 5. The power supply 50 may be accompanied, in some embodiments, by a power delay circuit 51 to allow for an orderly 'power up' of sequential receivers 13a-1, thus avoiding a power surge and over-current event in the central processor data 30A-B transmission lines.

An advantage, in some examples, to the present embodiment of the UWB receiver system 600 is that packet data and measurement results can be transferred at high speeds to TOA measurement buffers, the arbitrate/buffer function 26, such that the receivers 13a-1 can receive and process tag 12a-f (and corresponding object) locating signals on a nearly continuous basis. That is, multiple UWB data packets 120 can be processed in close succession, thereby allowing the use of hundreds to thousands of tag transmitters.

In some embodiments, data stored in TOA measurement buffers, the arbitrate/buffer function 26, is sent to a central processor/hub 11, shown in FIG. 5, over the central processor data transmission lines 30A-B in response to a specific request from the central processor/hub 11.

In some embodiments, the collection of the central processor data 30A-B transmission lines, connecting a "daisy chain" 19 network of receivers, is comprised of two bi-directional data links. In some embodiments, these data links may be RS422 differential serial links. A network interface may receive command signals from a central processor/hub 11 on one link, for example, to instruct a transfer of the TOA measurement buffer, the arbitrate/buffer function 26, to the central processor/hub 11. Additional commands may include those to adjust UWB receiver 22 operating characteristics such as gain and detection thresholds. The bi-directional data links may also provide for a buffer for data signals linked between "daisy chain" 19 receivers, buffering sequential transmissions between the present and next receiver 13a-1 in a communications chain.

The synchronous frequency up/down convert performed on the 10 MHz receiver clock 40 provides for a driver for the receiver clock 40 transmitted to the next receiver in the "daisy chain" 19. An advantage of this approach, in some examples, is that the 10 MHz receiver clock 40 transmitted to the next receiver—as with the original 10 MHz receiver clock 40—may be made low enough in frequency so that it can be transmitted over low-cost cables (e.g., twisted pair wires). Since timing jitter of the local timing reference signal degrades as the PLL multiplier coefficient is increased, there is a necessary trade-off between frequency and jitter of the local timing reference signal and the frequency of the timing reference clock.

Utilizing a common 10 MHz receiver clock 40 for timing reference, a plurality of local timing reference signals (one in each receiver) can be precisely matched in frequency. Using this approach, additional receivers can be connected without concern for clock loading. Buffer delay is also not an issue since the timing reference clock is used for frequency only, and not phase reference.

In some embodiments, the 10 MHz receiver clock 40 may comprise differential signals. The use of differential clock signals is advantageous since they avoid clock duty cycle distortion which can occur with the transmission of relatively high-speed clocks (e.g., >10 MHz) on long cables (e.g., >100 feet).

FIG. 7 illustrates an exemplary embodiment of the UWB TOA and data recovery circuits 700, presented in the UWB receiver system 600 as TOA and data recovery circuits 24, shown in FIG. 6, in accordance with some embodiments of the present invention. In an example embodiment, the UWB TOA data and recovery circuits 700 comprise a windowing/gating function 71, a TOA function 72, a window control clock and data recovery (PLL) function 73, a TOA averaging function 74, a data sync and extract function (1 MHz-2 MHz) 75-76, and a tag data recovery and processing function 77. The UWB TOA and data recovery circuits 700 process the digital data stream 23, shown in FIG. 6, to provide an unpacked data packet and the TOA associated with the RTLS tag to the arbitrate/buffer function 26.

The windowing/gating function 71 and the window control clock and data recovery (PLL) function 73 work as a feedback loop to recover the TX clock 101 and provide for the adjustable timing window function 200, as presented in FIG. 2, by tracking the RX pulses 111R' that comprise the RX pulse train 211R corresponding to the TX pulses 111T' in the series of TX pulses 111 in the preamble 110. The TOA function 72 works in conjunction with the 100 MHz receiver clocks 42-43. The RX clock 42 (201) provides for the TOA coarse time 46. The parallel set of fine detector windows 43 (340) provides for a TOA fine time associated with the RX fine timing window function 300, shown in FIG. 3, recording detections by a registration code 350 for the RX pulses 111R' that correspond to the sync code 112 TX pulses 111T'. The description for the adjustable timing window function 200 and the RX fine timing window function 300 are given previously with the presentation of FIGS. 2-3, respectively.

The TOA fine time—the registration code 350, the disjoint timing windows 231A-C, as determined by the adjustable timing window function 200, and the coarse time 46 are sent to the TOA averaging function 74, along with a latch TOA control signal indicating the end of a TOA determination. The TOA averaging function 74 is activated by a calculate TOA trigger 78, whereby the sub-window resolution function 400, as previously described with regard to FIG. 4, is initiated to determine the TOA with sub-window accuracy; that is, with resolution less than 1 nsec. The averaged TOA 80 is then sent to the tag data recovery and processing function 77.

The data sync and extract functions (1 MHz-2 MHz) 75-76 are triggered upon phase lock of the PLL associated with the window control clock and data recovery (PLL) function 73. Phase lock of the PLL is determined by the previously described feedback loop comprising the windowing/gating function 71 and the window control clock and data recovery (PLL) function 73, whereby the feedback loop effectively recovers the TX clock 101 by tracking the RX pulses 111R' corresponding to the preamble 110.

Upon phase lock, whereby the preamble 110 is synchronized to a recovered TX clock, the data packet 120, beginning with the remainder of the preamble 110, is extracted and unpacked by the data sync and extract function 75 (76) at a sampling rate of 1 Mhz (2 MHz), and sent to the tag data recovery and processing function 77. In another embodiment, the data sync and extract functions 75-76 are both set to sample the data packet 120 with a sampling rate of 2 MHz, but the two functions may differ by a data format. In one example, the data extracted by function 75 may follow a non-IOS format, where the data extracted by function 76 may follow an IOS format.

The tag data recovery and processing function 77 serves as a data processor for the data extracted by the data sync and extract functions 75-76 and as a communications control function, and also provides for data exchange associated with the arbitrate/buffer function 26, shown in FIG. 6. The data tag recovery and processing function 77 sends the TOA and data packet 120 information from the TOA averaging function 74 and the data sync and extract functions 75, 76, respectively, on TOA line 25 to the arbitrate/buffer function 26, which selects the earliest TOA from the three TOA functions running concurrently in the UWB TOA and data recovery circuits 700, and combines the TOA with the data packet 120 data into a tag message 27 to send to the tag data queue 28. At this point, the tag message 27 comprises at least the average TOA 80 and TX ID 120B extracted from the data packet 120 associated with the given tag transmission. The tag data queue 28, as described previously with respect to FIG. 6, effectively functions as a FIFO buffer for data transmission to the central processor/hub 11.

The tag data recovery and processing function 77 also serves as a controller for the timing of a triggering of the TOA averaging function 74 and a locking/unlocking 79 of the PLL in the window control clock and data recovery (PLL) function 73. The TOA averaging function 74 is initiated by the calculate TOA trigger 78 set by the tag data memory and processing controller 77, whereby the TOA trigger 78 is a function of a sync code 112 detection and a waiting interval associated with the data sync and extract function 75-76. The locking/unlocking 79 of the PLL is a function of a PLL lock indication initiated at the window control clock and data recovery (PLL) function 73, as described previously. And the locking/unlocking 79 of the PLL is reset to unlock the PLL upon detection in the sync and data extract functions 75-76 that the end of the data packet 120 has been reached, that the sampling of the data packet for the given tag transmission is complete.

The TOA averaging function 74 is elucidated by the sub-window resolution function 400, as described with regard to FIGS. 4, 8a, and 8b, and is initiated by the calculate TOA trigger 78. The TOA averaging function 74 may, in some examples, register a transition as successive RX pulses exhibit a change in detection registration, as demonstrated in FIG. 4. In another example, a TOA numerical average may be constructed to assign a TOA with sub-window resolution. A TOA numerical average may be constructed, according to FIG. 4, whereby RX pulses 1-5, for example, are assigned a weight equal to 4 nsec greater than the leading edge of the final center disjoint timing window 233B, and RX pulses 6-8 are assigned a weight equal to 3 nsec greater than the leading edge of the final center disjoint timing window 233B. As such, a TOA average is calculated as: 410 nsec+($5/8 \times 14$ nsec)+($3/8 \times 13$ nsec)=$414 5/8$ nsec.

FIG. 8a illustrates an example method for determining a time of arrival with sub-window resolution that includes receiving blink data from a tag at a receiver, wherein the blink data comprises a series of pulses (block 802); determining a coarse estimate of a time-of-arrival (TOA) of blink data from at least two of a plurality of receivers based on a detection of a pulse that is part the series of pulses in an adjustable coarse timing window (block 804), wherein the coarse estimate is based on a plurality of coarse timing windows; determining a fine estimate of the TOA from the at least two of the plurality of receivers based on a detection of the pulse in at least one of a parallel set of fine timing windows (block 806); and determining a sub-window resolution of the TOA from the at least two of the plurality of receivers based on the at least one detection transition between consecutive fine receiver windows of at least one of a plurality of pulses (block 808), wherein the sub-window resolution is based on a weighted average of the series of pulses, wherein each pulse is weighted based on a distance from the at least one detection transition between consecutive fine receiver windows. FIG. 8b illustrates an additional example method for determining a time of arrival with sub-window resolution that includes determining a first coarse timing window based on the detection of a pulse for at least two of the plurality of receivers (block 850); determining the plurality of coarse timing windows based on the detection of a plurality of pulses and a coarse timing window function for at least two of the plurality of receivers (block 852); and determining the parallel set of fine timing windows based on at least one of the plurality of coarse timing windows (block 854).

Exemplary embodiments of the present invention have been described herein. The invention is not limited to these examples. These examples are presented herein for purposes of illustration, and not limitation. Alternatives (including equivalents, extensions, variations, deviations, etc., of those described herein) may be apparent to persons skilled in the relevant art(s) based in the teachings contained herein. Such alternatives fall within the scope and spirit of the invention.

All publications, patents, and patent applications mentioned in this specification are herein incorporated by reference to the same extent as if each individual publication, patent, or patent application was specifically and individually indicated to be incorporated by reference.

That which is claimed:

1. A method for determining target location in a multiple receiver target location system, the method comprising:
    receiving a tag transmission signal from a tag at a receiver, wherein the tag transmission signal comprises a series of pulses;
    determining a coarse estimate of a time-of-arrival (TOA) of the tag transmission signal based on a detection of a pulse of the series of pulses in an adjustable coarse timing window, wherein the coarse estimate is based on a plurality of coarse timing windows;
    determining a fine estimate of the TOA based on a detection of the pulse in at least one of a parallel set of fine timing windows; and
    determining, using a processor of the receiver, a sub-window resolution of the TOA based on at least one detection transition between consecutive fine receiver windows of at least one of a plurality of pulses and a weighted average of the TOA for each pulse of the series of pulses.

2. The method of claim 1, further comprising determining the plurality of coarse timing windows via an iterative, adaptive feedback loop.

3. The method of claim 2, wherein the adaptive feedback loop is driven by a detection pattern.

4. The method of claim 1, further comprising determining the parallel set of fine timing windows by determining a set of fine timing windows synchronous to a receiver clock.

5. The method of claim 4, wherein the set of fine timing windows synchronous to the receiver clock are disjoint.

6. The method of claim 1, wherein determining the coarse estimate, the fine estimate, and the sub-window resolution of the TOA comprises a plurality of parallel detectors.

7. The method of claim 6, wherein the plurality of parallel detectors comprises distinct detection levels.

8. The method of claim 6, wherein the TOA is an earliest detection of the detection of the pulse from the plurality of parallel detectors.

9. The method of claim 1, wherein the TOA is associated with a tag unique identifier.

10. The method of claim 9, wherein the tag unique identifier is decoded at each of a plurality of receivers from a data packet transmitted by the target.

11. The method of claim 10, wherein the tag unique identifier decoding comprises one of an asynchronous sampling and a synchronous sampling.

12. The method of claim 11, wherein the synchronous sampling is based on a receiver clock.

13. The method of claim 11, wherein the asynchronous sampling comprises a target transmit clock recovery.

14. The method of claim 13, wherein the target transmit clock recovery comprises a tracking of the plurality of pulses.

15. The method of claim 14, wherein the tracking of the plurality of pulses is based on a phase-locked loop (PLL) indication.

16. The method of claim 7, wherein the distinct detection levels provide for determining whether the magnitude of the pulse is a signal or background noise interference.

17. The method of claim 7, wherein the distinct detection levels are adjusted based on dynamically monitoring a signal-to-noise ratio.

\* \* \* \* \*